United States Patent
Deonarine et al.

(10) Patent No.: US 12,242,375 B1
(45) Date of Patent: Mar. 4, 2025

(54) ON-DEMAND SWAP SPACE FOR VARIOUS PLATFORM COMPONENTS

(71) Applicant: Dell Products L.P., Round Rock, TX (US)

(72) Inventors: Jonathan Leonard Deonarine, Cedar Park, TX (US); Arulnambi Raju, Round Rock, TX (US); Wade Andrew Butcher, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 55 days.

(21) Appl. No.: 18/461,130

(22) Filed: Sep. 5, 2023

(51) Int. Cl.
 *G06F 12/02* (2006.01)
(52) U.S. Cl.
 CPC .................................. *G06F 12/023* (2013.01)
(58) Field of Classification Search
 CPC ..................................................... G06F 12/023
 See application file for complete search history.

(56) References Cited

U.S. PATENT DOCUMENTS

| | | | | |
|---|---|---|---|---|
| 5,964,874 A | * | 10/1999 | Gross | G06F 9/4401 713/100 |
| 7,281,105 B1 | * | 10/2007 | Wang | G06F 3/0689 711/112 |
| 2019/0258420 A1 | * | 8/2019 | Olderdissen | G06F 3/0604 |
| 2023/0008874 A1 | * | 1/2023 | Stabrawa | G06F 9/45558 |
| 2024/0394075 A1 | * | 11/2024 | Kelly | G06F 11/3051 |

* cited by examiner

*Primary Examiner* — Ryan Bertram
(74) *Attorney, Agent, or Firm* — Aly Z. Dossa; Chamberlain, Hrdlicka, White, Williams & Aughtry

(57) ABSTRACT

A method for provisioning swap spaces. The method includes: receiving, from a platform orchestrator of a service delivery platform and directed to provisioning a swap space, a swap space instruction specifying a swap space owner and a swap space size; requesting, from the platform orchestrator in response to receiving the swap space instruction and subsequently receiving, a swap space configuration associated with the swap space; based on at least a portion of the swap space configuration: selecting, at least based on the swap space size, at least one physical memory device; creating at least one volume on the at least one physical memory device; creating an emulated memory drive using the at least one volume; and presenting, to the swap space owner, the emulated memory drive as attached swap space representing the swap space.

20 Claims, 14 Drawing Sheets

ON-DEMAND SWAP SPACE FOR VARIOUS PLATFORM COMPONENTS

BACKGROUND

To support the execution of any number of workloads, processes, and/or tasks instantiated on any platform component, said platform component may rely on a variety of resources including a limited amount of memory resources (e.g., volatile and/or non-volatile memory) on which both active (or frequently accessed) and inactive (or infrequently accessed) information pertinent to said workloads, processes, and/or tasks may be maintained.

SUMMARY

In general, in one aspect, embodiments described herein relate to a method for provisioning swap spaces. The method includes: receiving, from a platform orchestrator of a service delivery platform and directed to provisioning a swap space, a swap space instruction specifying a swap space owner and a swap space size; requesting, from the platform orchestrator in response to receiving the swap space instruction and subsequently receiving, a swap space configuration associated with the swap space; based on at least a portion of the swap space configuration: selecting, at least based on the swap space size, at least one physical memory device; creating at least one volume on the at least one physical memory device; creating an emulated memory drive using the at least one volume; and presenting, to the swap space owner, the emulated memory drive as attached swap space representing the swap space.

In general, in one aspect, embodiments described herein relate to a system. The system includes: a service delivery platform including: a platform orchestrator; and a swap space controller operatively connected to the platform orchestrator, and including a computer processor at least configured to perform a method for provisioning swap spaces. The method includes: receiving, from a platform orchestrator and directed to provisioning a swap space, a swap space instruction specifying a swap space owner and a swap space size; requesting, from the platform orchestrator in response to receiving the swap space instruction and subsequently receiving, a swap space configuration associated with the swap space; based on at least a portion of the swap space configuration: selecting, at least based on the swap space size, at least one physical memory device; creating at least one volume on the at least one physical memory device; creating an emulated memory drive using the at least one volume; and presenting, to the swap space owner, the emulated memory drive as attached swap space representing the swap space.

In general, in one aspect, embodiments described herein relate to a non-transitory computer readable medium (CRM). The non-transitory CRM includes computer readable program code, which when executed by a computer processor, enables the computer processor to perform a method for provisioning swap spaces. The method includes: receiving, from a platform orchestrator of a service delivery platform and directed to provisioning a swap space, a swap space instruction specifying a swap space owner and a swap space size; requesting, from the platform orchestrator in response to receiving the swap space instruction and subsequently receiving, a swap space configuration associated with the swap space; based on at least a portion of the swap space configuration: selecting, at least based on the swap space size, at least one physical memory device; creating at least one volume on the at least one physical memory device; creating an emulated memory drive using the at least one volume; and presenting, to the swap space owner, the emulated memory drive as attached swap space representing the swap space.

Other aspects of the embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1A:
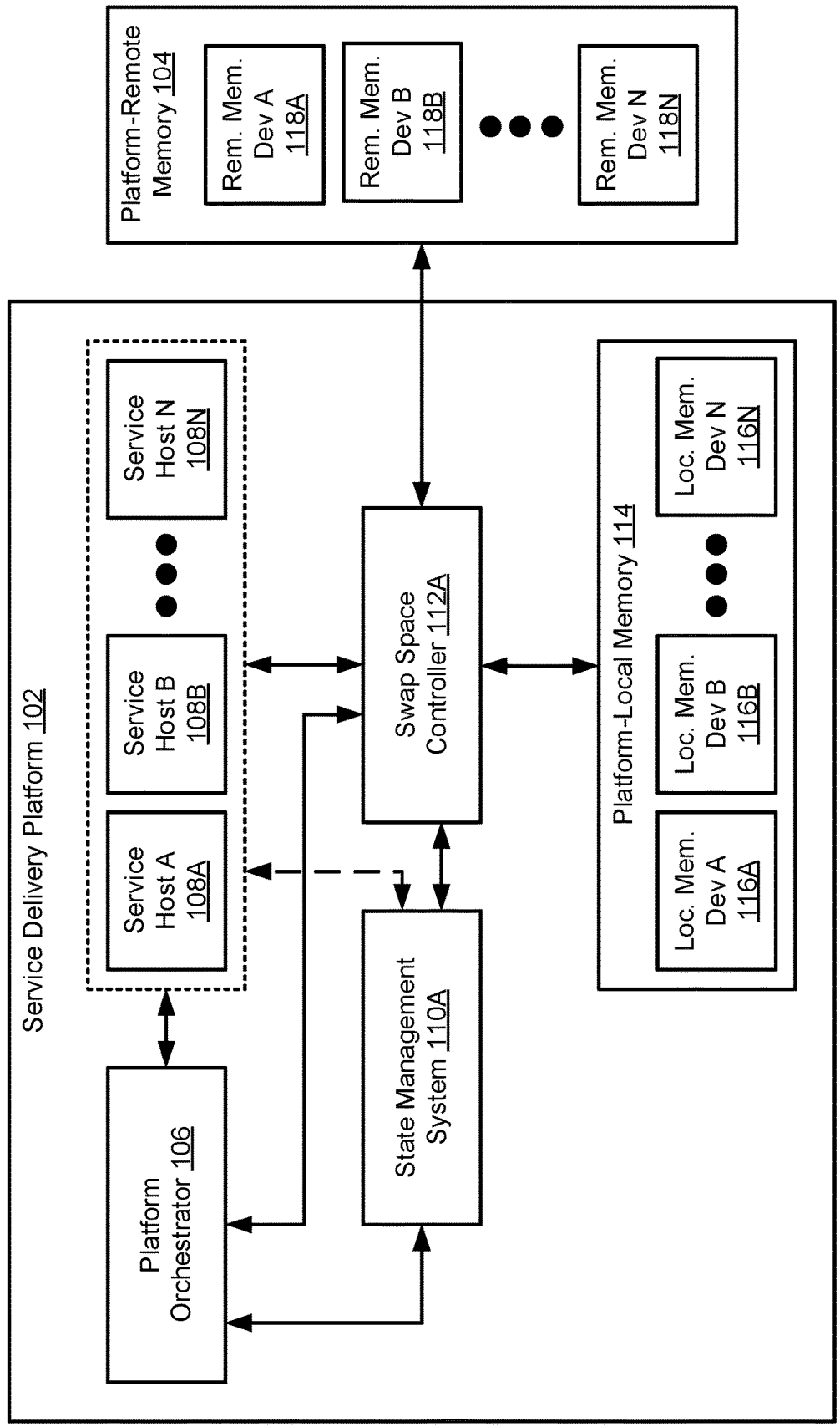
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to on-demand swap space for various platform components. To support the execution of any number of workloads, processes, and/or tasks instantiated on any platform component, said platform component may rely on a variety of resources including a limited amount of memory resources (e.g., volatile and/or non-volatile memory) on which both active (or frequently accessed) and inactive (or infrequently accessed) information pertinent to said workloads, processes, and/or tasks may be maintained. In due course as more, or more complex, workloads, processes, and/or tasks are running on said platform component, the limited amount of memory resources thereon may be increasingly allocated to these more, or more complex, workloads, processes, and/or tasks. Eventually, the available (or unallocated) memory space of the limited amount of memory resources becomes insufficient or approaches insufficiency in order to maintain said platform component operations.

Embodiments described herein, accordingly, implement a solution addressing the above-mentioned issue(s) by provisioning (or extending) an on-demand swap space, as needed, to each of one or more platform components. Particularly, the solution proposes the employment of virtual memory space to supplement any physical memory space (i.e., the limited amount of memory resources) on any platform component when the unallocated portion of the physical memory space thereon approaches insufficiency. The virtual memory space thus may free up the physical memory space on the platform component by enabling the storage or temporary transfer of any inactive (or infrequently accessed) memory page(s) thereto from the allocated portion of the physical memory space. The solution, further, proposes the offloading of swap space feature implementations, such as encryption and mirroring, from compute resources on any platform component to specialized hardware, thereby providing fault tolerant and/or secure on-demand swap spaces without the imposition created by said swap space feature implementations on said compute resources.

FIG. 1A shows a system in accordance with one or more embodiments described herein. The system (100) may include a service delivery platform (102) and platform-remote memory (104). Each of these system (100) components is described below.

In one or many embodiment(s) described herein, the service delivery platform (102) may represent enterprise information technology (IT) infrastructure at least configured to create, delete, configure, deploy, and/or maintain any number of services. The service delivery platform may also include functionality to manage and provision both physical and virtual resources, as needed, to support operation of any deployed services. One of ordinary skill, however, will appreciate that the service delivery platform (102) may perform other functionalities without departing from the scope of the embodiments described herein.

In one or many embodiment(s) described herein, the service delivery platform (102) may be implemented through on-premises infrastructure, cloud computing infrastructure, or any hybrid infrastructure thereof. The service delivery platform (102), accordingly, may be implemented using one or more network servers, where each network server may represent a physical or a virtual network server. Additionally, or alternatively, the service delivery platform (102) may be implemented using one or more computing systems similar to the exemplary computing system illustrated and described with respect to FIG. 6, below.

In one or many embodiment(s) described herein, the service delivery platform (102) may include a platform orchestrator (106), a set of service hosts (108A-108N), a state management system (110A), a swap space controller (112A), and platform-local memory (114). Each of these service delivery platform (102) components is described below.

In one or many embodiment(s) described herein, the platform orchestrator (106) may represent instruction-processing hardware (e.g., any number of integrated circuits for processing computer readable instructions), any number of computer programs executing on the underlying hardware of the service delivery platform (102), or any combination thereof, at least configured to oversee and/or manage service delivery platform (102) operations. To that extent, and at least in part, the platform orchestrator (106) may include functionality to perform the method illustrated and described with respect to FIG. 2, below—the method including: collecting memory metrics from various platform components (e.g., any service host (108A-108N), the state management system (110), and the swap space controller (112)); determining whether said memory metrics, for any given platform component, convey that the memory allocated thereto is approaching insufficiency to support processes executing thereon; and based on said approaching memory insufficiency, instructing the swap space controller (112) to provision swap space to the given platform component. One of ordinary skill, however, will appreciate that the platform orchestrator (106) may perform other functionalities without departing from the scope of the embodiments described herein.

In one or many embodiment(s) described herein, any service host (108A-108N) may represent and thus be implemented as a physical network server at least configured to provide an environment in which one or more services may be deployed and execute thereon. Alternatively, any service host (108A-108N) may be implemented on a computing system similar to the exemplary computing system illustrated and described with respect to FIG. 6, below. Further, in providing said environment for any service(s) deployed and executing thereon, any service host (108A-108N) may include and allocate various host resources (e.g., compute, memory, storage, virtualization, networking, etc.), as needed, to the service(s) and/or any task(s) (or workloads) instantiated thereby. An example service host (108A-108N) is illustrated and described in further detail below with respect to FIG. 1B.

In one or many embodiment(s) described herein, the state management system (110A) may represent specialized hardware (including compute, memory, storage, networking, etc.) at least configured to facilitate remote monitoring, control, and/or management of the service delivery platform (102). To that extent, and at least in part, the state management system (110A) may include functionality to: monitor the state (e.g., internal physical variables—temperature, power settings, fan speeds, etc.) of any number of physical (i.e., hardware) components throughout the service delivery platform (102); and enable administrators to conduct any number of management tasks concerning the service delivery platform (102)—e.g., power cycling, platform configuring, firmware updating, etc. One of ordinary skill, however, will appreciate that the state management system (110A) may perform other functionalities without departing from the scope of the embodiments described herein. Further, by way of an example, the state management system (110A) may be implemented using one or more baseboard management controllers (BMC). An example state management system (110A) is illustrated and described in further detail below with respect to FIG. 1C.

In one or many embodiment(s) described herein, the swap space controller (112A) may represent specialized hardware (including enhanced compute capable of handling complex data-centric workloads, memory, storage, networking, etc.) at least configured to provision, de-provision, and manage one or more swap spaces designated respectively for one or more platform components (e.g., any service host (108A-108N), the state management system (110), and the swap space controller (112A) itself). The swap space controller (112A) may also be capable of encrypting and decrypting swap space data, replicating swap space data via redundant array of inexpensive disks (RAID) 1 mirroring, and processing swap space data read and/or write requests. The swap space controller (112A), accordingly, may perform the methods illustrated and described with respect to FIGS. 3A-5B, below. One of ordinary skill, however, will appreciate that the swap space controller (112A) may perform other functionalities without departing from the scope of the embodiments described herein. Further, by way of an example, the swap space controller (112A) may be implemented using one or more data processing units (DPU). An example of the swap space controller (112A) is illustrated and described in further detail below with respect to FIG. 1D.

In one or many embodiment(s) described herein, the platform-local memory (114) may represent disaggregated memory, or scalable enterprise memory resources that form a logical memory pool, residing inside the infrastructure boundaries of the service delivery platform (102). The platform-local memory (114) may be implemented through the connection or combination of one or more physical, local memory devices (116A-116N) over a network fabric. Further, each physical, local memory device (116A-116N) may encompass non-transitory computer readable memory media on which various forms of digital information (e.g., structured and unstructured data) may be stored in whole or in part, and temporarily or permanently. Examples of non-transitory computer readable memory media may include, but may not be limited to, volatile memory (e.g., static random access memory (SRAM), dynamic random access memory (DRAM), and synchronous dynamic random access memory (SDRAM)) and non-volatile memory (e.g., read-only memory (ROM) and flash memory).

In one or many embodiment(s) described herein, the platform-remote memory (104) may represent disaggregated memory, or scalable enterprise memory resources that form a logical memory pool, residing outside the infrastructure boundaries of the service delivery platform (102). The platform-remote memory (104) may be implemented through the connection or combination of one or more physical, remote memory devices (118A-118N) over a network fabric. Further, each physical, remote memory device (118A-118N) may encompass non-transitory computer readable memory media on which various forms of digital information (e.g., structured and unstructured data) may be stored in whole or in part, and temporarily or permanently. Examples of non-transitory computer readable memory media may include, but may not be limited to, volatile memory (e.g., static random access memory (SRAM), dynamic random access memory (DRAM), and synchronous dynamic random access memory (SDRAM)) and non-volatile memory (e.g., read-only memory (ROM) and flash memory).

In one or many embodiment(s) described herein, the above-mentioned system (100) components (and/or any subcomponents thereof) may communicate with one another through one or more networks (not shown) (e.g., a local area network (LAN), a wide area network (WAN) such as the Internet, a mobile network, any other network type (e.g., a compute express link (CXL) network, an InfiniBand network, etc.), or any combination thereof). The network(s) may be implemented using any combination of wired and/or wireless connections. Further, the network(s) may encompass various interconnected, network-enabled subcomponents (or systems) (e.g., switches, routers, gateways, etc.) that may facilitate communications between the above-mentioned system (100) components (and/or any subcomponents thereof). Moreover, in communicating with one another, the above-mentioned system (100) components (and/or any subcomponents thereof) may employ any combination of wired and/or wireless communication protocols.

While FIG. 1A shows a configuration of components and/or subcomponents, other system (100) configurations may be used without departing from the scope of the embodiments described herein.

For example, in one or many embodiment(s) described herein, instead of residing outside any service host (108A-108N) (as depicted in FIG. 1A), a state management system (110B) (not shown) (see e.g., FIG. 1B) may reside and operate in each service host (108A-108N). In one or many other embodiment(s) described herein, the state management system (110A) may be omitted (i.e., not exist), whereas each service host (108A-108N) may instead include a state management system (110B) (not shown) (see e.g., FIG. 1B).

By way of another example, in one or many embodiment(s) described herein, the swap space controller(s) (112A) (residing/operating outside any service host (108A-108N) as depicted in FIG. 1A) may be omitted (i.e., not exist) and thus may be replaced by a swap space controller (112B) (not shown) (see e.g., FIG. 1B) included in each service host (108A-108N).

Figure 1B:
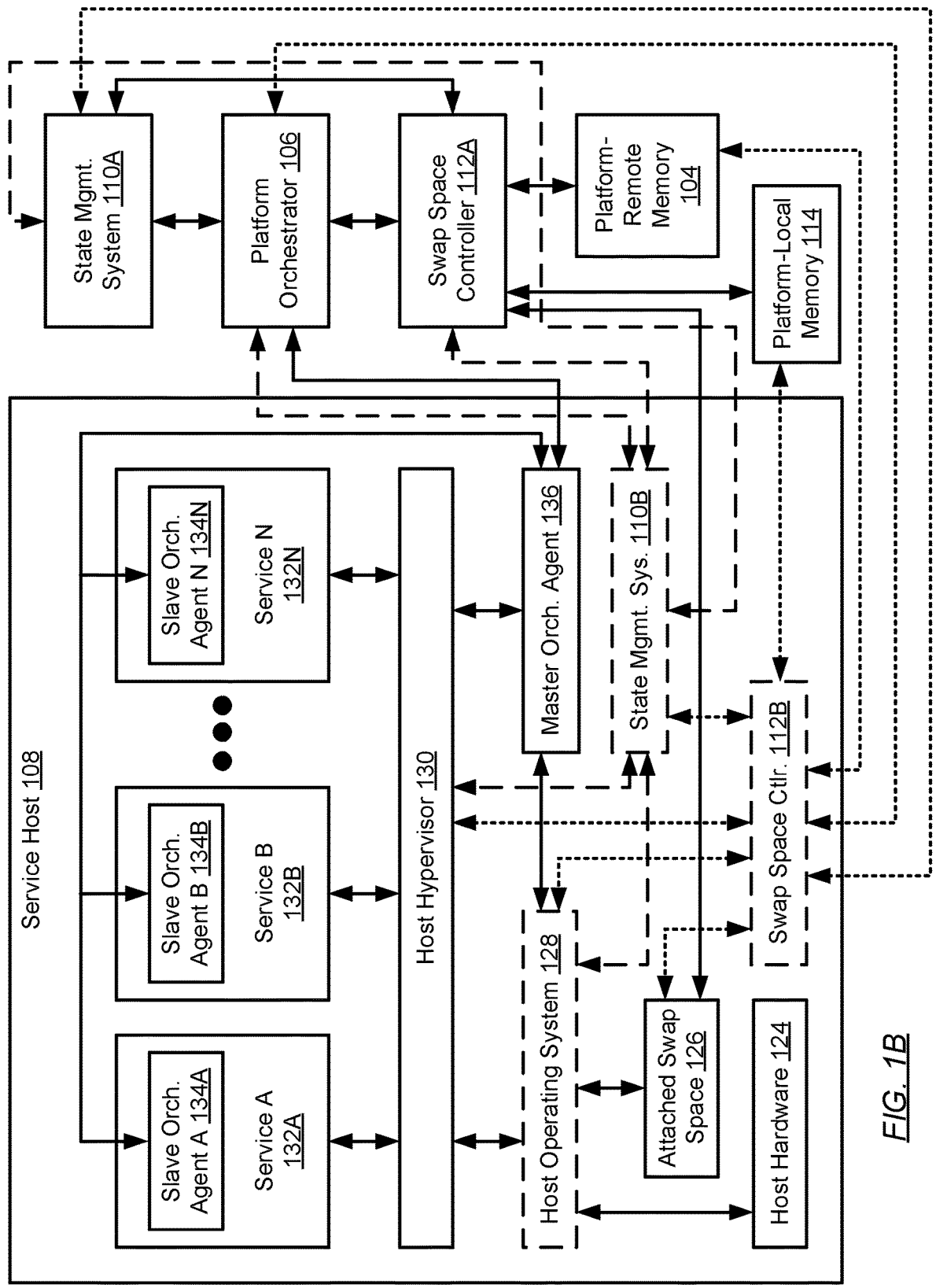
FIG. 1B shows a service host in accordance with one or more embodiments described herein.

FIG. 1B shows a service host in accordance with one or more embodiments described herein. The service host (108) may include host hardware (124), an attached swap space (126), (optionally) a host operating system (128), a host hypervisor (130), one or more services (132A-132N), and a master orchestrator agent (136). Each of these service host (108) components is described below.

In one or many embodiment(s) described herein, the host hardware (124) may refer to physical resources natively available to, or physically installed on, the service host (108). The host hardware (124) may include, but is not limited to: compute resources (i.e., any number of integrated circuits for processing computer readable instructions—e.g., one or more central processing units (CPU) also referred to herein as computer processor(s)); memory resources (i.e., any number of non-volatile and/or volatile memory devices); storage resources (i.e., any number of non-transitory computer readable storage media or storage devices—e.g., optical storage, magnetic storage, and/or solid state storage); networking resources (i.e., any number of integrated circuits for receiving and transmitting data over any network fabric—e.g., network adapter(s), network interface(s), etc.); and accelerated compute resources (i.e., any number of specialized integrated circuits for speeding up and processing demanding workloads through the use of parallel processing—e.g., graphics processing units (GPU), data processing units (DPU), tensor processing units (TPU), vision processing units (VPU), etc.).

In one or many embodiment(s) described herein, the attached swap space (126) may refer to virtual memory space serving as a substitute for any memory resources (described above) physically installed on the service host (108). The virtual memory space may be implemented on or across one or more physical memory devices (or portions thereof) of the platform-local memory (see e.g., FIG. 1A) and/or the platform-remote memory (also see e.g., FIG. 1A). The attached swap space (126), further, may be provisioned to the service host (108) should the physically installed memory resources of (and/or any existing attached swap space (126) already allocated to) the service host (108) run out of available space or approach insufficiency to support the current task(s) instantiated on/by the service host (108). Accordingly, the attached swap space (126) (either initially provisioned or extended) may provide the abstraction that the service host (108) has more memory resources than those physically installed thereon, and thus may serve the purpose of freeing up said memory resources that can be directed to supporting more important tasks instantiated on/by the service host (108). Moreover, the attached swap space (126) may be used by the service host (108) to store or temporarily move inactive or infrequently accessed pages (also referred herein as swap space data) of memory from the physically installed memory resources of the service host (108).

In one or many embodiment(s) described herein, the (optional) host operating system (128) may refer to a computer program that may execute on the underlying hardware (i.e., host hardware (124)) of the service host (108), which may be responsible for overseeing service host (108) operations. To that extent, and at least in part, the (optional) host operating system (128) may include functionality to: support fundamental service host (108) functions (described above) (see e.g., FIG. 1A); schedule tasks; mediate interactivity between logical (e.g., software) and physical (e.g., hardware) service host (108) components; allocate and/or de-allocate any granularity of the host hardware (124) and/or attached swap space (126) as needed; and execute or invoke other computer program(s) (e.g., host hypervisor (130), master orchestrator agent (136), etc.) executing on the service host (108). One of ordinary skill, however, will appreciate that the (optional) host operating system (128) may perform other functionalities without departing from the scope of the embodiments described herein.

In one or many embodiment(s) described herein, the host hypervisor (130) may refer to a computer program that may execute on the underlying hardware (i.e., host hardware (124)) of the service host (108), which may be responsible for creating, deleting, and managing virtualization resources (e.g., virtual machines and/or containers, such as the service(s) (132A-132N) deployed on the service host (108). To that extent, and at least in part, the host hypervisor (130) may include functionality to: allocate and de-allocate any granularity of the host hardware (124) and/or attached swap space (126), as needed, to support operation of any service (132A-132N) (either through interfacing with host operating system (128) if installed or through interfacing with the host hardware (124) and/or the attached swap space (126) directly if the host operating system (128) is not installed). One of ordinary skill, however, will appreciate that the host hypervisor (130) may perform other functionalities without departing from the scope of the embodiments described herein.

In one or many embodiment(s) described herein, any service (132A-132N) may refer to a virtual network server (e.g., a virtual machine or container configured to emulate a physical network server) whereon a guest operating system (not shown) and/or any number of workloads (e.g., applications) (not shown) may execute. When resources (e.g., any granularity of the host hardware (124) and/or the attached swap space (126)) may be needed to support the workload(s) tasked to execute therein, any service (132A-132N) may include functionality to: communicate or request said needed resources to the host hypervisor (130) and, subsequently, receive access to said needed resources therefrom. One of ordinary skill, however, will appreciate that any service (132A-132N) may perform other functionalities without departing from the scope of the embodiments described herein.

In one or many embodiment(s) described herein, any service (132A-132N) may include a slave orchestrator agent (134A-134N). Any slave orchestrator agent (134A-134N) may refer to a computer program (e.g., a workload) executing within the virtual environment implemented by a service (132A-132N), which may be responsible for information exchange between the service (132A-132N) and the master orchestrator agent (136) (described below). To that extent, and at least in part, any slave orchestrator agent (134A-134N), respective to a service (132A-132N), may include functionality to: monitor, via requests directed to the host hypervisor (130), service memory metrics (e.g., amount of the memory resources physically installed on the service host (108) (and/or the attached swap space (126) (if already provisioned)) allocated and consumed by the service (132A-132N), consumption rate of said memory resources (and/or the attached swap space (126) (if already provisioned)) by the service (132A-132N), etc.) concerning the service (132A-132N); and provide said service memory metrics either periodically or on-demand to the master orchestrator agent (136). One of ordinary skill, however, will appreciate that any slave orchestrator agent (134A-134N) may perform other functionalities without departing from the scope of the embodiments described herein.

In one or many embodiment(s) described herein, the master orchestrator agent (136) may refer to a computer program executing on the underlying hardware (i.e., host hardware (124)) of the service host (108), which may be responsible for information exchange between the service host (108) and the platform orchestrator (106). To that extent, and at least in part, the master orchestrator agent (136) may include functionality to: monitor, via requests directed to the host operating system (128) if installed or the host hypervisor (130) if the host operating system (128) is not installed, host memory metrics (e.g., amount of available (i.e., free) memory amongst the physically installed memory resources of the service host (108) (and/or the attached swap space (126) (if already provisioned)), amount of the memory resources physically installed on the service host (108) (and/or the attached swap space (126) (if already provisioned)) allocated and consumed by other (non-service) processes executing on the service host (108), consumption rate of said memory resources (and/or the attached swap space (126) (if already provisioned)) by said other (non-service) processes, etc.) concerning the service host (108); receive service memory metrics (described above) from any slave orchestrator agent (134A-134N) either periodically or on-demand; provide said service memory metrics and said host memory metrics (the combination thereof also referred to herein as memory metrics) to the platform orchestrator (106) either periodically or on-demand; receive a request for a swap space configuration (described below) (see e.g., FIGS. 3A-5B) for the attached swap space (126) (if yet to be provisioned) from the platform orchestrator (106) on behalf of the swap space controller (112); obtain, via requests directed to the host operating system (128) if installed or the host hypervisor (130) if the host operating system (128) is not installed, any information detailing the swap space configuration; and provide the swap space configuration to the platform orchestrator (106) in fulfillment of the received request thereof. One of ordinary skill, however, will appreciate that the master orchestrator agent (136) may perform other functionalities without departing from the scope of the embodiments described herein.

While FIG. 1B shows a configuration of components and/or subcomponents, other service host (108) configurations may be used without departing from the scope of the embodiments described herein.

For example, in one or many embodiment(s) described herein, the service host (108) may additionally include a/an (internal) state management system (110B). In said embodiment(s), the (internal) state management system (110B) may represent specialized hardware (including compute, memory, storage, networking, etc.) at least configured to facilitate remote monitoring, control, and/or management of the service host (108). To that extent, and at least in part, the (internal) state management system (110B) may include functionality to: monitor the state (e.g., internal physical variables-temperature, power settings, fan speeds, etc.) of any number of physical (i.e., host hardware (124)) components of the service host (108); and enable administrators to conduct any number of management tasks concerning the service host (108)—e.g., power cycling, host configuring, firmware updating, etc. One of ordinary skill, however, will appreciate that the (internal) state management system (110B) may perform other functionalities without departing from the scope of the embodiments described herein. Further, by way of an example, the (internal) state management system (110B) may be implemented using one or more baseboard management controllers (BMC). An example (internal) state management system (110B) is illustrated and described in further detail below with respect to FIG. 1C.

Furthermore, in said above-mentioned embodiment(s), the (internal) state management system (110B) may either co-exist or not co-exist with the (external) state management system (110A). If the (internal) state management system (110B) co-exists with the (external) state management system (110A), then the former may provide any monitored state, concerning the service host (108), to the latter either periodically or on-demand. The former, therefore, may operate as a slave device, whereas the latter may operate as a master device which would serve as an aggregation point for any monitored state concerning any service host (108). Alternatively, if the (internal) state management system (110B) does not co-exist with the (external) state management system (110A) (i.e., the service delivery platform (102) (see e.g., FIG. 1A) would not include the latter), then the (internal) state management system (110B) on any service host (108) may operatively connect and communicate to/with the (external) swap space controller (112A) (or a/an (internal) swap space controller (112B) (described below)) and the platform orchestrator (106).

By way of another example, in one or many other embodiment(s) described herein, the service host (108) may additionally include a/an (internal) swap space controller (112B) (which may be included with or without the above-described (internal) state management system (110B)). In said other embodiment(s), the (internal) swap space controller (112B) may represent specialized hardware (including enhanced compute capable of handling complex data-centric workloads, memory, storage, networking, etc.) at least configured to provision, de-provision, and manage a swap space (e.g., attached swap space (126)) designated for any service host (108), the (external) state management system (110A), the (internal) state management system (110B), and the (internal) swap space controller (112B) itself). The (internal) swap space controller (112B) may also be capable of encrypting and decrypting swap space data, replicating swap space data via redundant array of inexpensive disks (RAID) 1 mirroring, and processing swap space data read and/or write requests. The (internal) swap space controller (112B), accordingly, may perform the methods illustrated and described with respect to FIGS. 3A-5B, below. One of ordinary skill, however, will appreciate that the (internal) swap space controller (112B) may perform other functionalities without departing from the scope of the embodiments described herein. Further, by way of an example, the (internal) swap space controller (112B) may be implemented using one or more data processing units (DPU). An example of the (internal) swap space controller (112B) is illustrated and described in further detail below with respect to FIG. 1D.

Figure 1C:
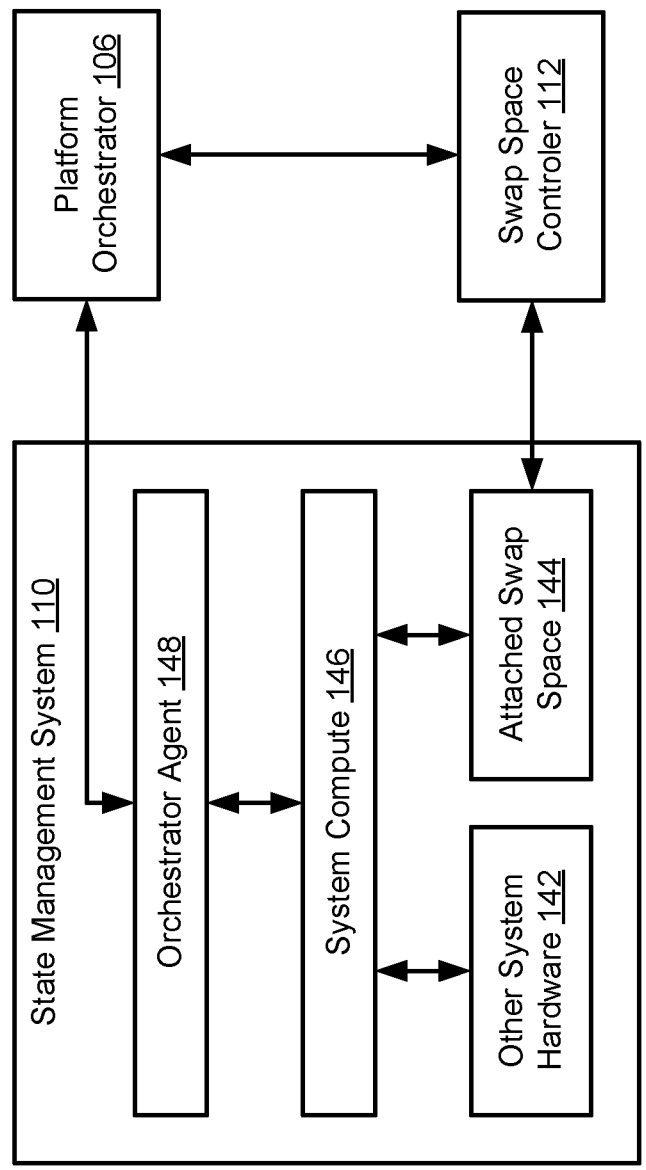
FIG. 1C shows a state management system in accordance with one or more embodiments described herein.
Figure 1D:
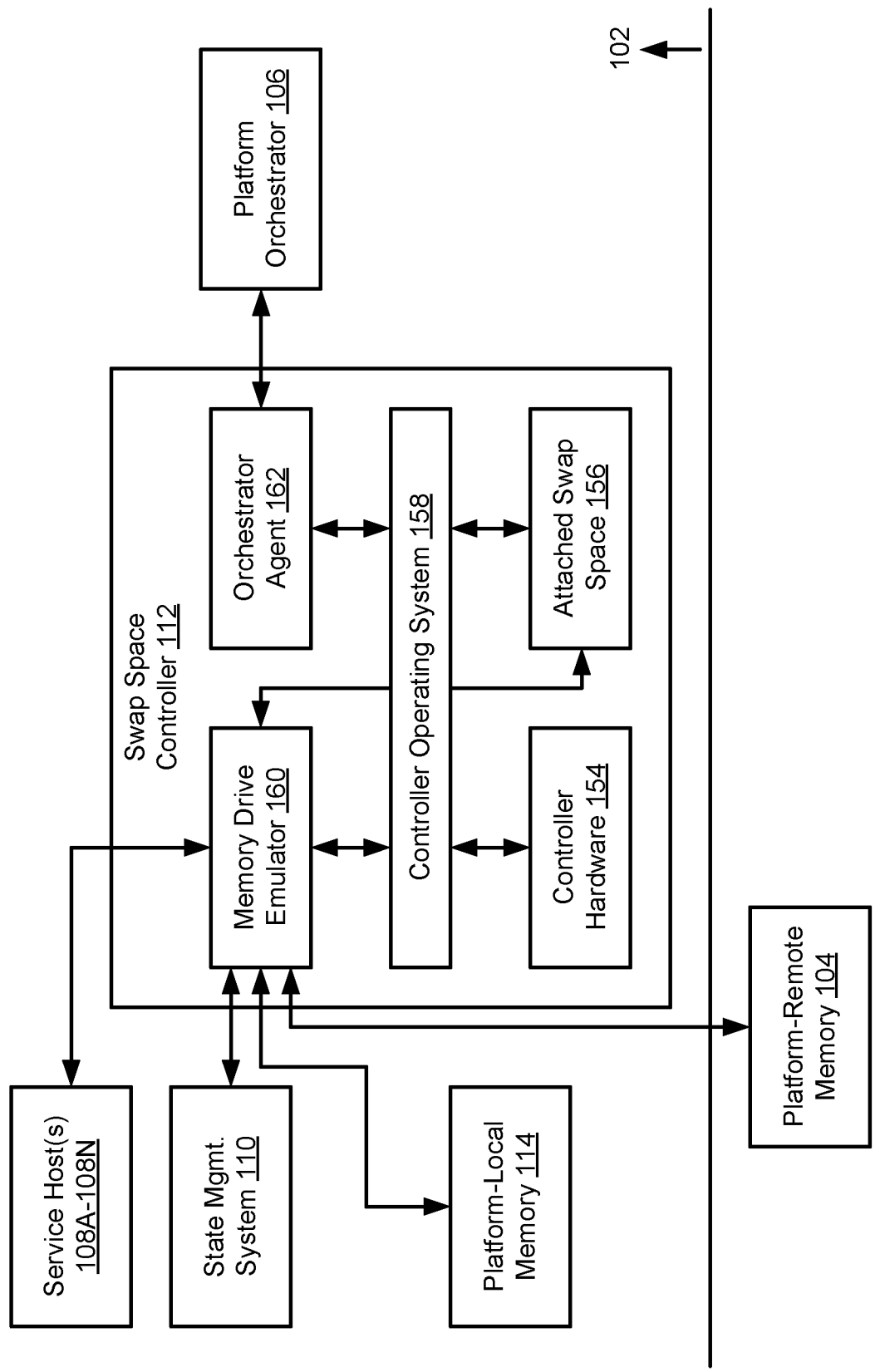
FIG. 1D shows a swap space controller in accordance with one or more embodiments described herein.

Moreover, in said above-mentioned other embodiment(s), the (internal) swap space controller (112B) would not co-exist with the (external) swap space controller (112A). That is, the (internal) swap space controller (112B) in any service host (108) (if materialized and operating thereon) would replace the (external) swap space controller (112A) included in the service delivery platform (102) as depicted in FIG. 1A. Accordingly, the (internal) swap space controller (112B) may operate as the (external) swap space controller (112A)

would (described in FIGS. 1A and 1D). Further, the (internal) swap space controller (112B) may operatively connect and communicate to/with the platform-remote memory (104), the platform-local memory (114), the platform orchestrator (106), at least one of the (internal) state management system (110B) and the (external) state management system (110A), and (optionally) other service host(s) (not shown).

FIG. 1C shows a state management system in accordance with one or more embodiments described herein. The state management system (110) (i.e., a/an (external) state management system (110A) residing/operating within the service delivery platform (102) but outside any service host (108A-108N) (see e.g., FIG. 1A) and/or a/an (internal) state management system (110B) residing/operating within any/each service host (108A-108N) (see e.g., FIG. 1B)) may include other system hardware (142), an attached swap space (144), system compute (146), and an orchestrator agent (148). Each of these state management system (110) components is described below.

In one or many embodiment(s) described herein, other (i.e., encompassing non-compute) system hardware (142) may refer to physical resources natively available to, or physical installed on, the state management system (110). The other system hardware (142) may include, but is not limited to: memory resources (i.e., any number of non-volatile and/or volatile memory devices); storage resources (i.e., any number of non-transitory computer readable storage media or storage devices—e.g., optical storage, magnetic storage, and/or solid state storage); and networking resources (i.e., any number of integrated circuits for receiving and transmitting data over any network fabric—e.g., network adapter(s), network interface(s), etc.).

In one or many embodiment(s) described herein, the attached swap space (144) may refer to virtual memory space serving as a substitute for any memory resources (described above) physically installed on the state management system (110). The virtual memory space may be implemented on or across one or more physical memory devices (or portions thereof) of the platform-local memory (see e.g., FIGS. 1A and 1B) and/or the platform-remote memory (also see e.g., FIGS. 1A and 1B). The attached swap space (144), further, may be provisioned to the state management system (110) should the physically installed memory resources of (and/or any existing attached swap space (144) already allocated to) the state management system (110) run out of available space or approach insufficiency to support the current task(s) instantiated on/by the state management system (110). Accordingly, the attached swap space (144) (either initially provisioned or extended) may provide the abstraction that the state management system (110) has more memory resources than those physically installed thereon, and thus may serve the purpose of freeing up said memory resources that can be directed to supporting more important tasks instantiated on/by the state management system (110). Moreover, the attached swap space (144) may be used by the state management system (110) to store or temporarily move inactive or infrequently accessed pages (also referred herein as swap space data) of memory from the physically installed memory resources of the state management system (110).

In one or many embodiment(s) described herein, the system compute (146) may refer to physical (compute) resources natively available to, or physical installed on, the state management system (110). Said physical (compute) resources may include any number of integrated circuits for processing computer readable instructions—e.g., one or more central processing units (CPU) also referred to herein as computer processor(s). Further, the system compute (146) may be configured to oversee state management system (110) operations. To that extent, and at least in part, the system compute (146) may include functionality to: support fundamental state management system (110) functions (described above) (see e.g., FIGS. 1A and 1B); mediate interactivity between logical (e.g., software) and physical (e.g., hardware) state management system (110) components; allocate and/or de-allocate any granularity of itself (146), the other system hardware (142), and/or the attached swap space (144) as needed; and execute or invoke other computer program(s) and/or process(es) (e.g., orchestrator agent (148), etc.) executing on the state management system (110). One of ordinary skill, however, will appreciate that the system compute (146) may perform other functionalities without departing from the scope of the embodiments described herein.

In one or many embodiment(s) described herein, the orchestrator agent (148) may refer to a computer program executing on the underlying hardware (i.e., the system compute (146) and/or the other system hardware (142)) of the state management system (110), which may be responsible for information exchange between the state management system (110) and the platform orchestrator (106). To that extent, and at least in part, the orchestrator agent (148) may include functionality to: monitor, via requests directed to the system compute (146), memory metrics (e.g., amount of the memory resources (described above) physically installed on the state management system (110) (and/or the attached swap space (144) (if already provisioned)) allocated and consumed by processes executing on the state management system (110), consumption rate of said memory resources (and/or the attached swap space (144) (if already provisioned)) by said processes, amount of available (i.e., free) memory amongst said memory resources of the state management system (110) (and/or the attached swap space (144) (if already provisioned)), etc.) concerning the state management system (110); provide said memory metrics to the platform orchestrator (106) either periodically or on-demand; receive a request for a swap space configuration (described below) (see e.g., FIGS. 3A-5B) for the attached swap space (144) (if yet to be provisioned) from the platform orchestrator (106) on behalf of the swap space controller (112); obtain, via requests directed to the system compute (146), any information detailing the swap space configuration; and provide the swap space configuration to the platform orchestrator (106) in fulfillment of the received request thereof. One of ordinary skill, however, will appreciate that the orchestrator agent (148) may perform other functionalities without departing from the scope of the embodiments described herein.

While FIG. 1C shows a configuration of components and/or subcomponents, other state management system (110) configurations may be used without departing from the scope of the embodiments described herein.

FIG. 1D shows a swap space controller in accordance with one or more embodiments described herein. The swap space controller (112) (i.e., a/an (external) swap space controller (112A) residing/operating within the service delivery platform (102) but outside any service host (108A-108N) (see e.g., FIG. 1A) or a/an (internal) swap space controller (112B) residing/operating within any/each service host (108A-108N) (see e.g., FIG. 1B)) may include controller hardware (154), an attached swap space (156), a controller operating system (158), a memory drive emulator (160), and an orchestrator agent (162). Each of these swap space controller (112) components is described below.

In one or many embodiment(s) described herein, the controller hardware (154) may refer to physical resources natively available to, or physical installed on, the swap space controller (112). The controller hardware (154) may include, but is not limited to: compute resources (i.e., any number of integrated circuits for processing computer readable instructions—e.g., one or more central processing units (CPU) also referred to herein as computer processor(s)); memory resources (i.e., any number of non-volatile and/or volatile memory devices); storage resources (i.e., any number of non-transitory computer readable storage media or storage devices—e.g., optical storage, magnetic storage, and/or solid state storage); and networking resources (i.e., any number of integrated circuits for receiving and transmitting data over any network fabric—e.g., network adapter(s), network interface(s), etc.).

In one or many embodiment(s) described herein, the attached swap space (156) may refer to may refer to virtual memory space serving as a substitute for any memory resources (described above) physically installed on the swap space controller (112). The virtual memory space may be implemented on or across one or more physical memory devices (or portions thereof) of the platform-local memory (114) and/or the platform-remote memory (104). The attached swap space (156), further, may be provisioned to the swap space controller (112) should the physically installed memory resources of (and/or any existing attached swap space (156) already allocated to) the swap space controller (112) run out of available space or approach insufficiency to support the current task(s) instantiated on/by the swap space controller (112). Accordingly, the attached swap space (156) (either initially provisioned or extended) may provide the abstraction that the swap space controller (112) has more memory resources than those physically installed thereon, and thus may serve the purpose of freeing up said memory resources that can be directed to supporting more important tasks instantiated on/by the swap space controller (112). Moreover, the attached swap space (156) may be used by the swap space controller (112) to store or temporarily move inactive or infrequently accessed pages (also referred herein as swap space data) of memory from the physically installed memory resources of the swap space controller (112).

In one or many embodiment(s) described herein, the controller operating system (158) may refer to a computer program that may execute on the underlying hardware (i.e., controller hardware (154)) of the swap space controller (112), which may be responsible for overseeing swap space controller (112) operations. To that extent, and at least in part, the controller operating system (158) may include functionality to: support fundamental swap space controller (112) functions (described above) (see e.g., FIGS. 1A and 1B); schedule tasks; mediate interactivity between logical (e.g., software) and physical (e.g., hardware) swap space controller (112) components; allocate and/or de-allocate any granularity of the controller hardware (154) and/or the attached swap space (156) as needed; and execute or invoke other computer program(s) (e.g., memory drive emulator (160), orchestrator agent (162), etc.) executing on the swap space controller (112). One of ordinary skill, however, will appreciate that the controller operating system (158) may perform other functionalities without departing from the scope of the embodiments described herein.

In one or many embodiment(s) described herein, the memory drive emulator (160) may refer to instruction-processing hardware (e.g., any number of integrated circuits for processing computer readable instructions), a computer program executing on the underlying hardware (i.e., controller hardware (154)) of the swap space controller (112), or any combination thereof, at least configured to emulate one or more physical memory drives (e.g., any non-transitory computer readable memory media (exemplified above) (see e.g., FIG. 1A) used as auxiliary memory). Any emulated memory drive, in turn, may refer to a virtual or software-defined memory drive, which may imitate a physical memory drive. Any emulated memory drive, further, may be implemented using one or more physical memory devices (or portions thereof) stemming from platform-local memory (114), platform-remote memory (104), or any combination thereof.

Furthermore, in one or many embodiment(s) described herein, the memory drive emulator (160) may additionally be configured to: present or provide any emulated memory drive to a designated platform component (e.g., any service host (108A-108N), the state management system (110), and the swap space controller (112) itself) as attached (or mounted) swap space (e.g., 156); and if an encryption feature is enabled regarding any attached swap space (e.g., 156) designated for any platform component, encrypt (plaintext) swap space data (e.g., data accessible via the attached swap space (e.g., 156)) using any existing encryption algorithm and an encryption key provided by the platform component to produce (ciphertext) swap space data that may be stored on the physical memory device(s) (or portions thereof) (of the platform-local memory (114) and/or the platform-remote memory (104)) backing the attached swap space (e.g., 156), as well as decrypt (ciphertext) swap space data (e.g., encrypted data stored in the physical memory device(s) (or portions thereof)) (of the platform-local memory (114) and/or the platform-remote memory (104)) using any existing decryption algorithm (i.e., serving as the counterpart for the existing encryption algorithm used) and the encryption key provided by the platform component to produce (plaintext) swap space data.

Moreover, in one or many embodiment(s) described herein, the memory drive emulator (160) may also be configured to: if a mirroring feature is enabled regarding any attached swap space (e.g., 156) designated for any platform component, replicate (via RAID 1 mirroring) and store any (plaintext) or (ciphertext) swap space data across at least two different physical memory devices (of the platform-local memory (114) and/or the platform-remote memory (104)) backing the attached swap space (e.g., 156); receive and process any number of read requests from any designated platform component and directed to retrieving any swap space data (in plaintext or ciphertext form) from one or more physical memory devices (or portions thereof) (of the platform-local memory (114) and/or the platform-remote memory (104)) backing the attached swap space (e.g., 156) belonging to the designated platform component and, subsequently, making said retrieved swap space data (in plaintext form) accessible via a respective attached swap space (e.g., 156) to the designated platform component; and receive and process any number of write requests from any designated platform component and directed to storing any swap space data (in plaintext or ciphertext form) to one or more physical memory devices (or portions thereof) (of the platform-local memory (114) and/or the platform-remote memory (104)) backing the attached swap space (e.g., 156) belonging to the designated platform component.

One of ordinary skill, however, will appreciate that the memory drive emulator (160) may perform other functionalities without departing from the scope of the embodiments described herein.

In one or many embodiment(s) described herein, the orchestrator agent (162) may refer to a computer program executing on the underlying hardware (i.e., the controller hardware (154)) of the swap space controller (112), which may be responsible for information exchange between the swap space controller (112) and the platform orchestrator (106). To that extent, and at least in part, the orchestrator agent (162) may include functionality to: monitor, via requests directed to the controller operating system (158), memory metrics (e.g., amount of the memory resources (described above) physically installed on the swap space controller (112) (and/or the attached swap space (156) (if already provisioned)) allocated and consumed by processes executing on the swap space controller (112), consumption rate of said memory resources (and/or the attached swap space (156) (if already provisioned)) by said processes, amount of available (i.e., free) memory amongst said memory resources of the swap space controller (112) (and/or the attached swap space (156) (if already provisioned)), etc.) concerning the swap space controller (112); provide said memory metrics to the platform orchestrator (106) either periodically or on-demand; receive swap space instructions from the platform orchestrator (106)—each swap space instruction either directing the swap space controller (112) to provisioning a (new) attached swap space (e.g., 156) to a designated platform component or extending an (existing) attached swap space (e.g., 156) already provisioned to a designated platform component; inform the platform orchestrator (106) upon completion of any swap space instruction; receive a request for a swap space configuration (described below) (see e.g., FIGS. 3A-5B) for the attached swap space (156) (if yet to be provisioned) from the platform orchestrator (106) on behalf of the orchestrator agent (162) itself; obtain, via requests directed to the controller operating system (158), any information detailing the swap space configuration; and provide the swap space configuration to the platform orchestrator (106) in fulfillment of the received request thereof. One of ordinary skill, however, will appreciate that the orchestrator agent (162) may perform other functionalities without departing from the scope of the embodiments described herein.

In one or many embodiment(s) described herein, the swap space controller (112) may further include a swap space database (not shown). The swap space database may refer to a data repository for maintaining the swap space configuration (described below) (see e.g., FIGS. 3A-5B) for any attached swap space(s) (e.g., 156) provisioned to any designated platform component (e.g., any service host (108A-108N), the state management system (110), and the swap space controller (112) itself). Information stored in the swap space database may be organized through one or more swap space records. Each swap space record may pertain to or may be associated with a given platform component to which an attached swap space (e.g., 156) has been provisioned, and may include the swap space configuration for said attached swap space (e.g., 156). Further, the swap space database may be accessible to, and thus updated or modified by, the memory drive emulator (160); and may be implemented using at least a portion of the storage resources (described above) physically installed on the swap space controller (112).

While FIG. 1D shows a configuration of components and/or subcomponents, other swap space controller (112) configurations may be used without departing from the scope of the embodiments described herein.

Figure 2:
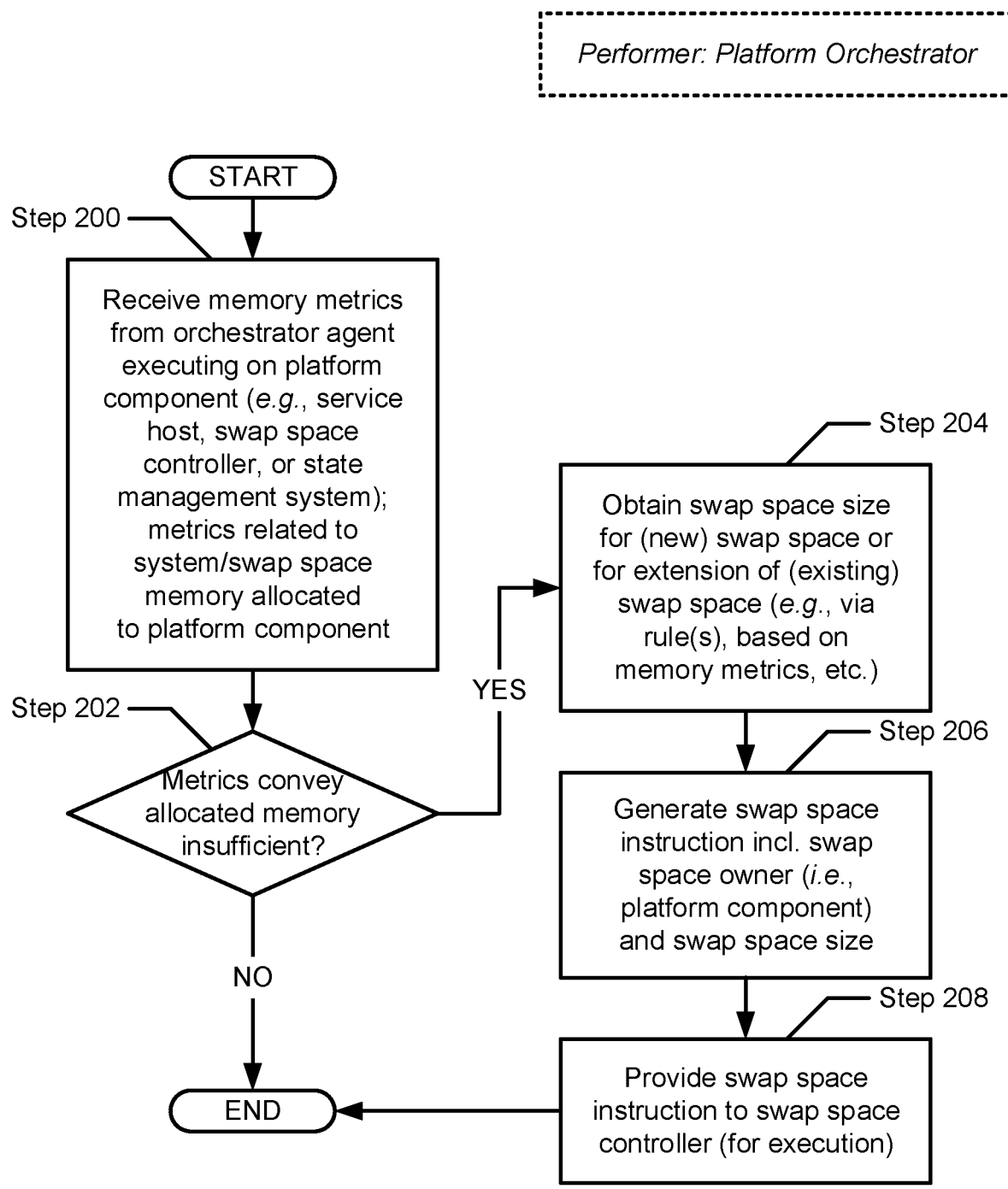
FIG. 2 shows a flowchart describing a method for processing memory metrics in accordance with one or more embodiments described herein.

FIG. 2 shows a flowchart describing a method for processing memory metrics in accordance with one or more embodiments described herein. The various steps outlined below may be performed by the platform orchestrator of the service delivery platform (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, memory metrics (described above) (see e.g., FIGS. 1B-1D) are received from an orchestrator agent executing on a platform component. In one or many embodiment(s) described herein, the platform component may be representative of any service host (see e.g., FIG. 1A), the swap space controller (i.e., the (external) swap space controller or any (internal) swap space controller (see e.g., FIG. 1A or 1B), or any state management system (i.e., the (external) state management system and/or any (internal) state management system (see e.g., FIGS. 1A and/or 1B)). Further, the memory metrics may include measurements related to any memory resources physically installed on the platform component (and/or any attached swap space or virtual memory already provisioned to the platform component).

In Step 202, a determination is made as to whether the memory metrics (received in Step 200), in whole or in part, convey or indicate that the physical and/or virtual memory allocated to the platform component is approaching insufficiency in terms of supporting the task(s) instantiated by the platform component thereon. By way of a non-limiting example, the determination may entail assessing an amount of available (i.e., free) memory amongst said physical and/or virtual memory as a percentage of a total allocated capacity of said physical and/or virtual memory against a predefined percentage threshold, where said physical and/or virtual memory may be approaching insufficiency should the available memory percentage equal or fall short of the predefined percentage threshold. As such, in one or many embodiment(s) described herein, if it is determined that the memory metrics reflect that the physical and/or virtual memory allocated to the platform component is approaching insufficiency, then the method proceeds to Step 204. On the other hand, in one or many embodiment(s) described herein, if it is alternatively determined that the memory metrics reflect that the physical and/or virtual memory allocated to the platform component is sufficient, then the method alternatively ends.

In Step 204, following the determination (made in Step 202) that the memory metrics (received in Step 200), in whole or in part, convey or indicate that the physical and/or virtual memory allocated to the platform component is approaching insufficiency, a swap space size is obtained. In one or many embodiment(s) described herein, the swap space size may reference an amount of virtual memory (e.g., expressed in bytes) ascertained to be provisioned as a (new) swap space (if not yet provisioned) to the platform component or as an extension to an (existing) swap space (if already provisioned) to the platform component. Further, the swap space size may be ascertained based on one or more factors—e.g., one or more predefined rules, the memory metrics, etc.

In Step 206, a swap space instruction is generated. In one or many embodiment(s) described herein, the swap space instruction may refer to a message (or computer readable program code) directed to the provisioning of a (new) swap space, or the extending of an (existing) swap space, for a swap space owner. The swap space owner may refer to a platform component (e.g., any service host, the swap space controller, or any state management system (all described above) (see e.g., FIGS. 1A and/or 1B)). Further, the swap space instruction may specify: the swap space owner; and a swap space size.

In Step 208, the swap space instruction (generated in Step 206) is subsequently provided to the swap space controller (see e.g., FIGS. 1A and 1D) for execution.

FIGS. 3A-3D show a flowchart describing a method for processing swap space instructions in accordance with one or more embodiments described herein. The various steps outlined below may be performed by the swap space controller (i.e., the (external) swap space controller of the service delivery platform (see e.g., FIGS. 1A and 1D) or any (internal) swap space controller of any service host (see e.g., FIGS. 1B and 1D). Further, while the various steps in the flowchart are presented and described sequentially, one of ordinary skill will appreciate that some or all steps may be executed in different orders, may be combined or omitted, and some or all steps may be executed in parallel.

Figure 3A:
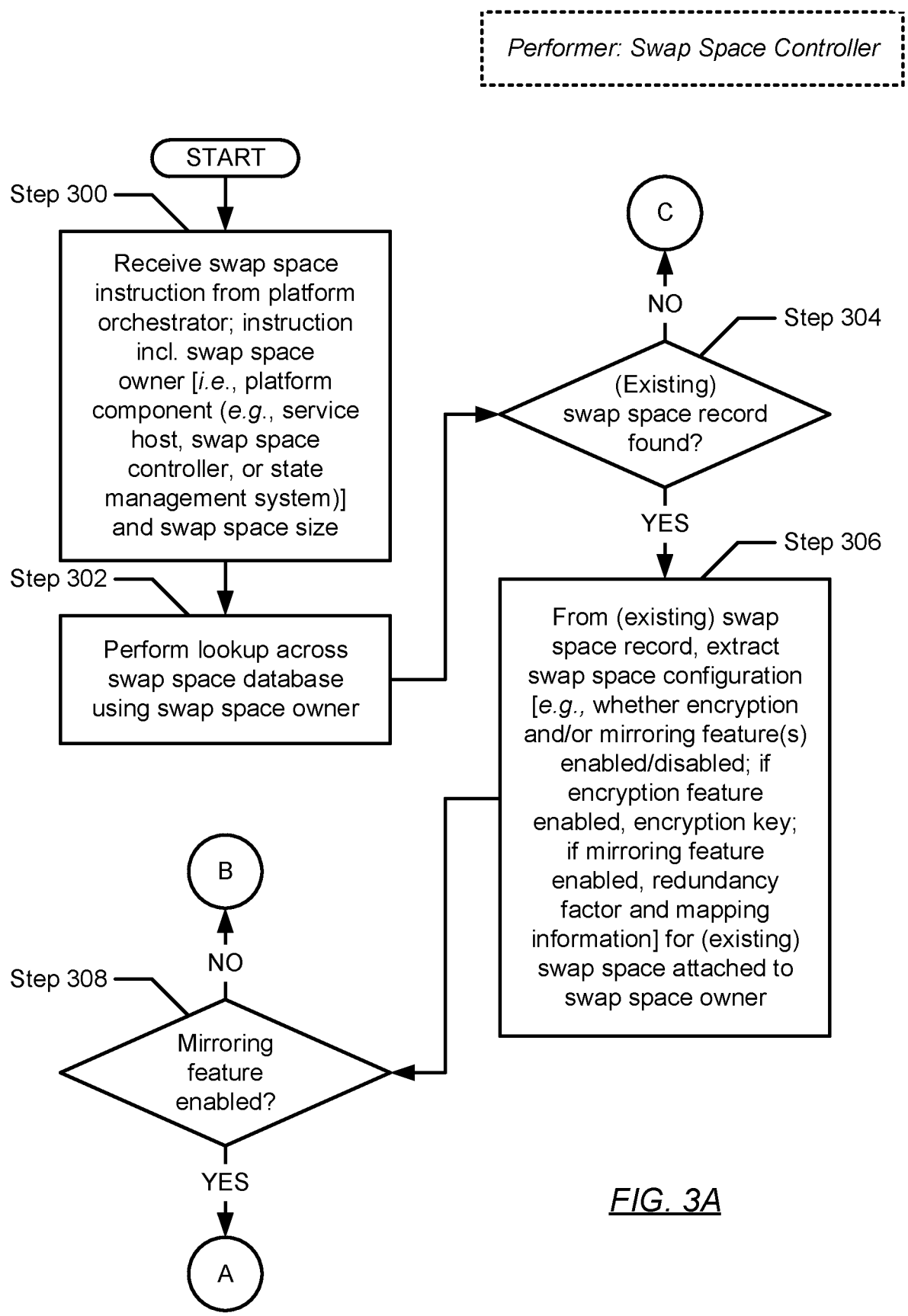
FIGS. 3A-3D show a flowchart describing a method for processing swap space instructions in accordance with one or more embodiments described herein.

Turning to FIG. 3A, in Step 300, a swap space instruction is received from the platform orchestrator (see e.g., FIG. 1A). In one or many embodiment(s) described herein, the swap space instruction may refer to a message (or computer readable program code) directed to the provisioning of a (new) swap space, or the extending of an (existing) swap space, for a platform component. To that extent, the swap space instruction may specify: a swap space owner (i.e., the platform component); and a swap space size referencing an amount of virtual memory (e.g., expressed in bytes) to be provisioned as the (new) swap space or to serve as an extension to the (existing) swap space on the swap space owner.

In Step 302, a lookup is performed on/across a swap space database (described above) (see e.g., FIG. 1D) using the swap space owner (or more specifically, a unique identifier assigned thereto) (received in Step 300). In one or many embodiment(s) described herein, the lookup may or may not result in the identification of an (existing) swap space record maintained in the swap space database.

In Step 304, a determination is made as to whether an (existing) swap space record has been identified based on the lookup (performed in Step 302). As such, in one or many embodiment(s) described herein, if it is determined that an (existing) swap space record has been identified, then the method proceeds to Step 306. On the other hand, in one or many other embodiment(s) described herein, if it is alternatively determined that an (existing) swap space record has not been identified, then the method alternatively proceeds to Step 330 (see e.g., FIG. 3C).

In Step 306, following the determination (made in Step 304) that an (existing) swap space record has been identified based on the lookup (performed in Step 302), a swap space configuration, for the attached swap space of the swap space owner, is extracted from the (existing) swap space record. In one or many embodiment(s) described herein, the swap space configuration may include: information (e.g., a binary or bit value) indicating whether an encryption feature, concerning any swap space data maintained on any physical memory device(s) (or portions thereof) of the platform-local memory and/or the platform-remote memory backing said attached swap space, is enabled or disabled; should the encryption feature be enabled, an encryption key provided earlier by the swap space owner and employed in the encryption of (plaintext) swap space data and the decryption of (ciphertext) swap space data; information (e.g., a binary or bit value) indicating whether a mirroring feature, concerning any swap space data maintained on any physical memory device(s) (or portions thereof) of the platform-local memory and/or the platform-remote memory backing said attached swap space, is enabled or disabled; and should the mirroring feature be enabled: a redundancy factor (e.g., expressed as a whole number) reflecting the number of swap space copies (i.e., at least two) that exist for the attached swap space across different physical memory devices, and mapping information relating a volume representative of each swap space copy to a location (or locations) (e.g., a memory address or memory addresses) on one or more physical memory devices of the platform-local memory and/or the platform-remote memory whereon the swap space copy resides.

In Step 308, based on the swap space configuration (extracted in Step 306), a determination is made as to whether the above-mentioned mirroring feature is enabled. By way of example, the determination may entail reading the information (e.g., a binary or bit value) indicating whether the mirroring feature is enabled or disabled. As such, in one or many embodiment(s) described herein, if it is determined that the mirroring feature is enabled, then the method proceeds to Step 314 (see e.g., FIG. 3B). On the other hand, in one or many other embodiment(s) described herein, if it is alternatively determined that the mirroring feature is disabled, then the method alternatively proceeds to Step 322 (see e.g., FIG. 3B).

Figure 3B:
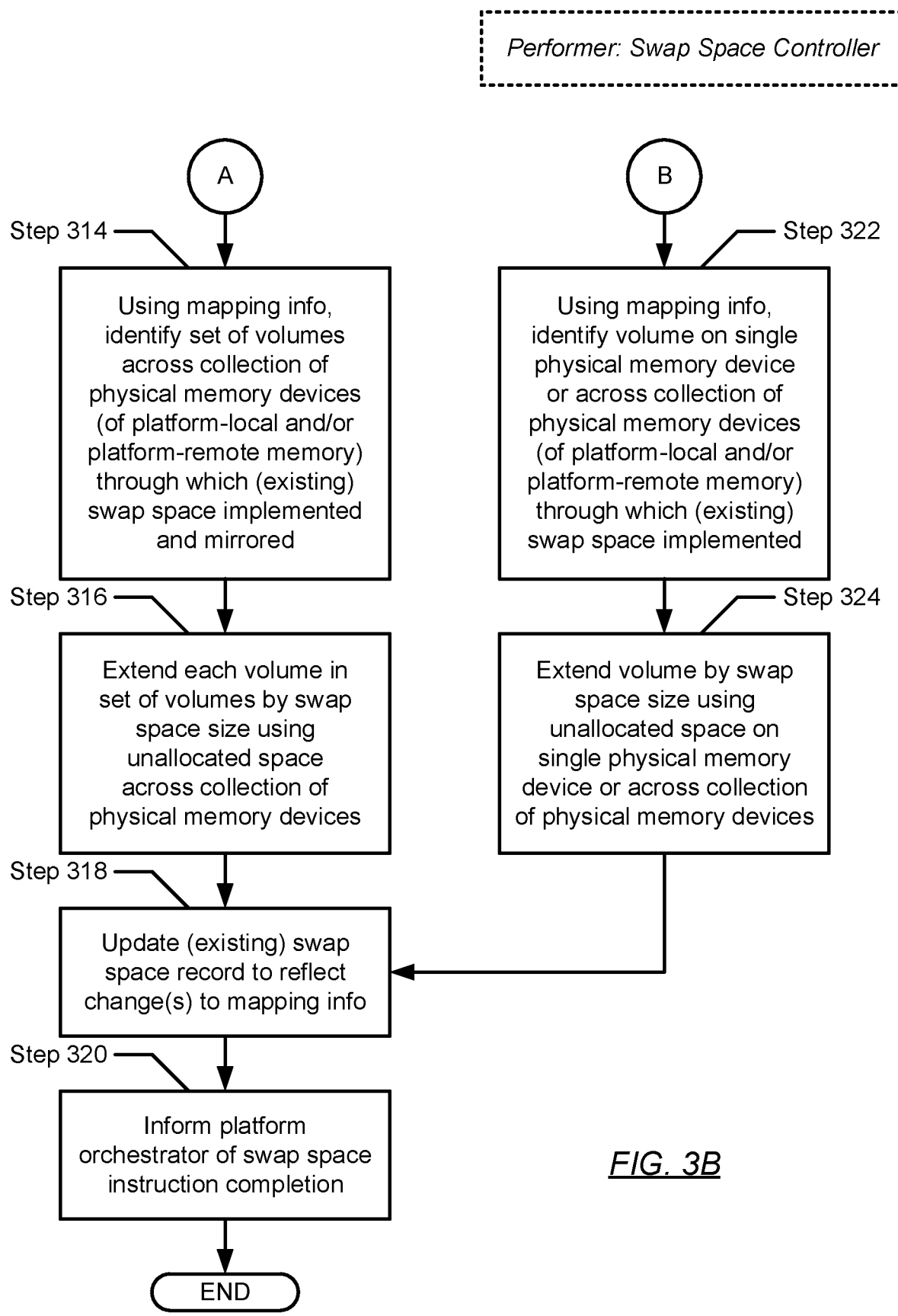

Turning to FIG. 3B, in Step 314, following the determination (made in Step 308) that the above-mentioned mirroring feature is enabled based on the swap space configuration (extracted in Step 306), a set of volumes is identified using the mapping information (specified in the swap space configuration). In one or many embodiment(s) described herein, a cardinality of the set of volumes may match the redundancy factor (also specified in the swap space configuration) and, accordingly, any given volume in the set of volumes may correspond to or be representative of a given swap space copy of the at least two swap space copies created/maintained through RAID 1 mirroring. Further, each volume in the set of volumes may reside on at least a portion of one or more physical memory devices (of the platform-local and/or the platform-remote memory) that is/are different from any other physical memory device(s) (or portions thereof) on which any other volume(s) in the set of volumes reside(s).

In Step 316, each volume in the set of volumes (identified in Step 314) is extended. In one or many embodiment(s) described herein, the extension of any volume (residing thus far on a single physical memory device and where the amount of any adjacent, contiguous unallocated space on said single physical memory device at least equals the swap space size (received in Step 300)) may entail incorporating memory space into the volume from at least a portion (i.e., equaling the swap space size) of the unallocated space of said single physical memory device, thereby maintaining the volume as a simple volume. In one or many other embodiment(s) described herein, the extension of any volume (residing thus far on a single physical memory device and where the amount of any adjacent, contiguous unallocated space on said single physical memory device falls short of the swap space size) may entail: selecting another physical memory device (of the platform-local or the platform-remote memory) that is different from any other physical memory device(s) (or portions thereof) on which the volume and any other volume(s) in the set of volumes reside, where the other physical memory device includes unallocated space at least equaling the swap space size; and incorporating memory space into the volume from at least a portion (i.e., equaling the swap space size) of the unallocated space on said other physical memory device, thereby transitioning the volume from a simple volume to a spanned volume.

In one or many other embodiment(s) still described herein, the extension of any volume (residing thus far across at least two different physical memory devices and where the total amount of unallocated space across said at least two different physical memory devices at least equals the swap space size) may entail incorporating memory space into the volume from at least a portion of the unallocated space on any one or more of said at least two different physical memory devices, where the combined portion(s) of the total unallocated space equals the swap space size, thereby maintaining the volume as a spanned volume. In one or many other embodiment(s) further still described herein, the extension of any volume (residing thus far across at least two different physical memory devices and where the total amount of unallocated space across said at least two different physical memory devices falls short of the swap space size) may entail: selecting another physical memory device (of the platform-local or the platform-remote memory) that is different from any other physical memory device(s) (or portions thereof) on which the volume and any other volume(s) in the set of volumes reside, where the other physical memory device includes unallocated space at least equaling the swap space size; and incorporating memory space into the volume from at least a portion (i.e., equaling the swap space size) of the unallocated space on said other physical memory device, thereby maintaining the volume as a spanned volume.

In Step 318, the (existing) swap space record (identified per the determination made in Step 304 based on the lookup performed in Step 302) is updated to reflect any change(s) to the mapping information specified in the swap space configuration stored therein. In one or many embodiment(s) described herein, any change(s) to the mapping information may, for example, include identifying information, as well as memory address(es), associated with any additional physical memory device(s) (or portions thereof) incorporated into any volume(s) forming the emulated memory device (and thus the attached swap space) for the swap space owner.

In Step 320, the platform orchestrator (from which the swap space instruction had been received in Step 300) is informed of the completion or fulfillment of the swap space instruction.

In Step 322, following the alternate determination (made in Step 308) that the above-mentioned mirroring feature is disabled based on the swap space configuration (extracted in Step 306), a single volume is identified using the mapping information (specified in the swap space configuration). In one or many embodiment(s) described herein, the single volume may correspond to or be representative of the attached swap space provisioned to the swap space owner (specified in the swap space instruction received in Step 300). Further, the single volume may reside on at least a portion of one or more physical memory devices (of the platform-local and/or the platform-remote memory).

In Step 324, the single volume (identified in Step 322) is extended. In one or many embodiment(s) described herein, the extension of the single volume (residing thus far on a single physical memory device and where the amount of any adjacent, contiguous unallocated space on said single physical memory device at least equals the swap space size (received in Step 300)) may entail incorporating memory space into the single volume from at least a portion (i.e., equaling the swap space size) of the unallocated space of said single physical memory device, thereby maintaining the volume as a simple volume. In one or many other embodiment(s) described herein, the extension of the single volume (residing thus far on a single physical memory device and where the amount of any adjacent, contiguous unallocated space on said single physical memory device falls short of the swap space size) may entail: selecting another physical memory device (of the platform-local or the platform-remote memory) that is different from the single physical memory device on which the single volume thus far resides, where the other physical memory device includes unallocated space at least equaling the swap space size; and incorporating memory space into the volume from at least a portion (i.e., equaling the swap space size) of the unallocated space on said other physical memory device, thereby transitioning the volume from a simple volume to a spanned volume.

In one or many other embodiment(s) still described herein, the extension of the single volume (residing thus far across at least two different physical memory devices and where the total amount of unallocated space across said at least two different physical memory devices at least equals the swap space size) may entail incorporating memory space into the single volume from at least a portion of the unallocated space on any one or more of said at least two different physical memory devices, where the combined portion(s) of the total unallocated space equals the swap space size, thereby maintaining the volume as a spanned volume. In one or many other embodiment(s) further still described herein, the extension of the single volume (residing thus far across at least two different physical memory devices and where the total amount of unallocated space across said at least two different physical memory devices falls short of the swap space size) may entail: selecting another physical memory device (of the platform-local or the platform-remote memory) that is different from the at least two different physical memory devices on which the single volume thus far resides, where the other physical memory device includes unallocated space at least equaling the swap space size; and incorporating memory space into the single volume from at least a portion (i.e., equaling the swap space size) of the unallocated space on said other physical memory device, thereby maintaining the volume as a spanned volume.

Hereinafter, the method proceeds to Step 318 (described above).

Figure 3C:
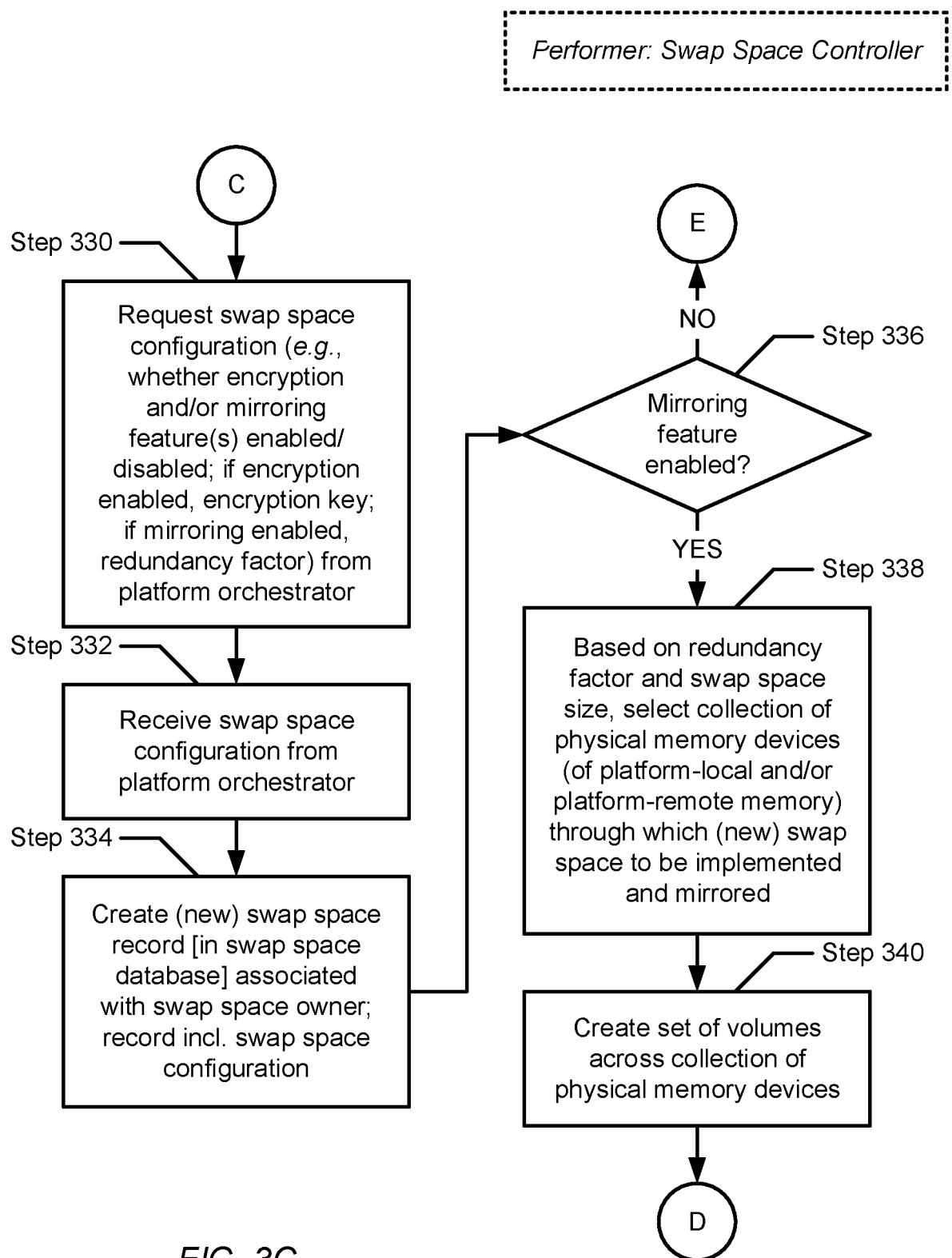

Turning to FIG. 3C, in Step 330, following the alternate determination (made in Step 304) that an (existing) swap space record has been identified based on the lookup (performed in Step 302), a swap space configuration, for a (new) swap space to be provisioned to the swap space owner, is requested from the platform orchestrator (from which the swap space instruction had been received in Step 300).

In one or many embodiment(s) described herein, upon receiving the swap space configuration request from the swap space controller, the platform orchestrator may relay, or delegate fulfillment of, said request to an orchestrator agent executing on the swap space owner. The orchestrator agent, in turn, may interact with an overseer (e.g., an operating system, a hypervisor, or compute resources) of the swap space owner to gather information detailing and thus representative of the requested swap space configuration. Thereafter, the orchestrator agent may return a response to the relayed or delegated swap space request to the platform orchestrator, where the response includes the requested swap space configuration. The platform orchestrator then provides the requested swap space configuration back to the swap space controller.

In Step 332, the swap space configuration (requested in Step 330), for a (new) swap space to be provisioned to the swap space owner, is received from the platform orchestrator. In one or many embodiment(s) described herein, the swap space configuration may include: information (e.g., a binary or bit value) indicating whether an encryption feature, concerning any swap space data maintained on any physical memory device(s) (or portions thereof) of the platform-local memory and/or the platform-remote memory backing said attached swap space, is enabled or disabled; should the encryption feature be enabled, an encryption key provided earlier by the swap space owner and employed in the encryption of (plaintext) swap space data and the decryption of (ciphertext) swap space data; information (e.g., a binary or bit value) indicating whether a mirroring feature, concerning any swap space data maintained on any physical memory device(s) (or portions thereof) of the platform-local memory and/or the platform-remote memory backing said attached swap space, is enabled or disabled; and should the mirroring feature be enabled, a redundancy factor (e.g., expressed as a whole number) reflecting the number of swap space copies (i.e., at least two) that exist for the attached swap space across different physical memory devices.

In Step 334, within a swap space database (described above) (see e.g., FIG. 1D), a (new) swap space record is created. In one or many embodiment(s) described herein, the (new) swap space record may be associated with the swap space owner (specified in the swap space instruction received in Step 300) and may include/store the swap space configuration (received in Step 332).

In Step 336, based on the swap space configuration (received in Step 332), a determination is made as to whether the above-mentioned mirroring feature is enabled. By way of example, the determination may entail reading the information (e.g., a binary or bit value) indicating whether the mirroring feature is enabled or disabled. As such, in one or many embodiment(s) described herein, if it is determined that the mirroring feature is enabled, then the method proceeds to Step 338. On the other hand, in one or many other embodiment(s) described herein, if it is alternatively determined that the mirroring feature is disabled, then the method alternatively proceeds to Step 356 (see e.g., FIG. 3D).

In Step 338, following the determination (made in Step 336) that the above-mentioned mirroring feature is enabled based on the swap space configuration (received in Step 332), a collection (e.g., at least two) of physical memory devices is selected. In one or many embodiment(s) described herein, a cardinality of the collection of physical memory devices may match the redundancy factor (also specified in the swap space configuration). Further, each physical memory device in the collection of physical memory devices may include unallocated space at least equaling the swap space size (specified in the swap space instruction received in Step 300). Each selected physical memory device, moreover, may pertain to a local memory device belonging to platform-local memory or to a remote memory device belonging to platform-remote memory. The collection of physical memory devices may be used to implement and replicate (via RAID 1 mirroring) the (new) swap space.

In Step 340, a set of volumes is created. In one or many embodiment(s) described herein, a cardinality of the set of volumes may match the redundancy factor (also specified in the swap space configuration). Further, any given volume in the set of volumes may reside on or incorporate at least a portion (i.e., equaling the swap space size) of the unallocated space on a physical memory device in the collection of physical memory devices (selected in Step 338). Creation of any volume, moreover, may entail formatting the at least portion of the unallocated space on a respective physical memory device such that any file system (employed on/by the swap space owner) may write and/or read any swap space data (e.g., any inactive or infrequently accessed memory page(s)) thereto and/or therefrom.

Hereinafter, the method proceeds to Step 346 (see e.g., FIG. 3D).

Figure 3D:
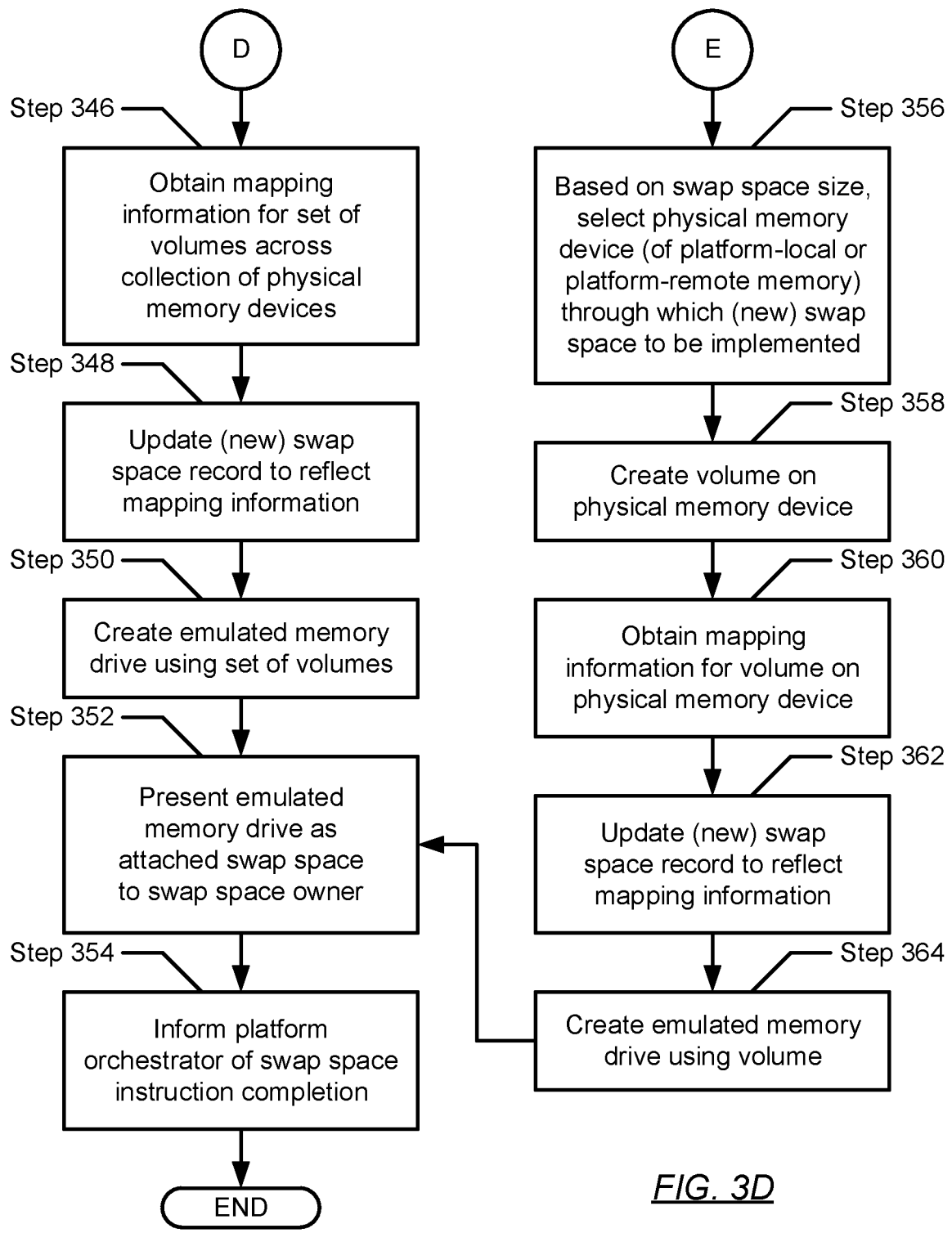

Turning to FIG. 3D, in Step 346, following the creation the set of volumes (in Step 340), mapping information is obtained. In one or many embodiment(s) described herein, said mapping information may encompass information relating each volume in the set of volumes (created in Step 340) to a corresponding physical memory device in the collection of physical memory devices (selected in Step 338). More specifically, said mapping information, for any given volume and corresponding physical memory device pair, may include: identifying information associated with the corresponding physical memory device; and a memory address belonging to the corresponding physical memory device whereat the volume commences. Said mapping information may include additional information without departing from the scope of the embodiments described herein.

In Step 348, the (new) swap space record (created in Step 334) is updated to reflect the mapping information (obtained in Step 346) as an addition to the swap space configuration (received in Step 332) already stored therein. In one or many embodiment(s) described herein, the combination of the received swap space configuration and the obtained mapping information may result in an updated swap space configuration for the (new) swap space to be provisioned to the swap space owner.

In Step 350, an emulated memory drive is created using the set of volumes (created in Step 340). In one or many embodiment(s) described herein, the emulated memory drive may refer to a virtual or software-defined memory drive, which may imitate a physical memory drive. Further, aside from imitating a physical memory drive, the emulated memory drive may include functionality to: apply any input-output (IO) transaction(s) (e.g., write and/or read requests), involving the (new) swap space, onto each volume in the set of volumes through which the (new) swap space may be implemented and/or replicated.

In Step 352, the emulated memory drive (created in Step 350) is presented to the swap space owner (specified in the swap space instruction received in Step 300). Specifically, in one or many embodiment(s) described herein, the emulated memory drive may be presented as attached swap space representing the (new) swap space provisioned to the swap space owner.

In Step 354, the platform orchestrator (from which the swap space instruction had been received in Step 300) is informed of the completion or fulfillment of the swap space instruction.

In Step 356, following the alternate determination (made in Step 336) that the above-mentioned mirroring feature is disabled based on the swap space configuration (received in Step 332), a single physical memory device is selected. In one or many embodiment(s) described herein, the single physical memory devices may include unallocated space at least equaling the swap space size (specified in the swap space instruction received in Step 300). Further, the selected single physical memory device may pertain to a local memory device belonging to platform-local memory or to a remote memory device belonging to platform-remote memory. The single physical memory device may be used to implement the (new) swap space.

In Step 358, a volume is created. In one or many embodiment(s) described herein, the volume may reside on or incorporate at least a portion (i.e., equaling the swap space size) of the unallocated space on the single physical memory device (selected in Step 356). Creation of the volume, furthermore, may entail formatting the at least portion of the unallocated space on the single physical memory device such that any file system (employed on/by the swap space owner) may write and/or read any swap space data (e.g., any inactive or infrequently accessed memory page(s)) thereto and/or therefrom.

In Step 360, mapping information is obtained. In one or many embodiment(s) described herein, said mapping information may encompass information relating the volume (created in Step 358) to the single physical memory device (selected in Step 356). More specifically, said mapping information may include: identifying information associated with the single physical memory device; and a memory address belonging to the single physical memory device whereat the volume commences. Said mapping information may include additional information without departing from the scope of the embodiments described herein.

In Step 362, the (new) swap space record (created in Step 334) is updated to reflect the mapping information (obtained in Step 360) as an addition to the swap space configuration (received in Step 332) already stored therein. In one or many embodiment(s) described herein, the combination of the received swap space configuration and the obtained mapping information may result in an updated swap space configuration for the (new) swap space to be provisioned to the swap space owner.

In Step 364, an emulated memory drive is created using the volume (created in Step 358). In one or many embodiment(s) described herein, the emulated memory drive may refer to a virtual or software-defined memory drive, which may imitate a physical memory drive. Further, aside from imitating a physical memory drive, the emulated memory drive may include functionality to: apply any input-output (IO) transaction(s) (e.g., write and/or read requests), involving the (new) swap space, onto the volume through which the (new) swap space may be implemented.

Hereinafter, the method proceeds to Step 352 (described above).

Figure 4A:
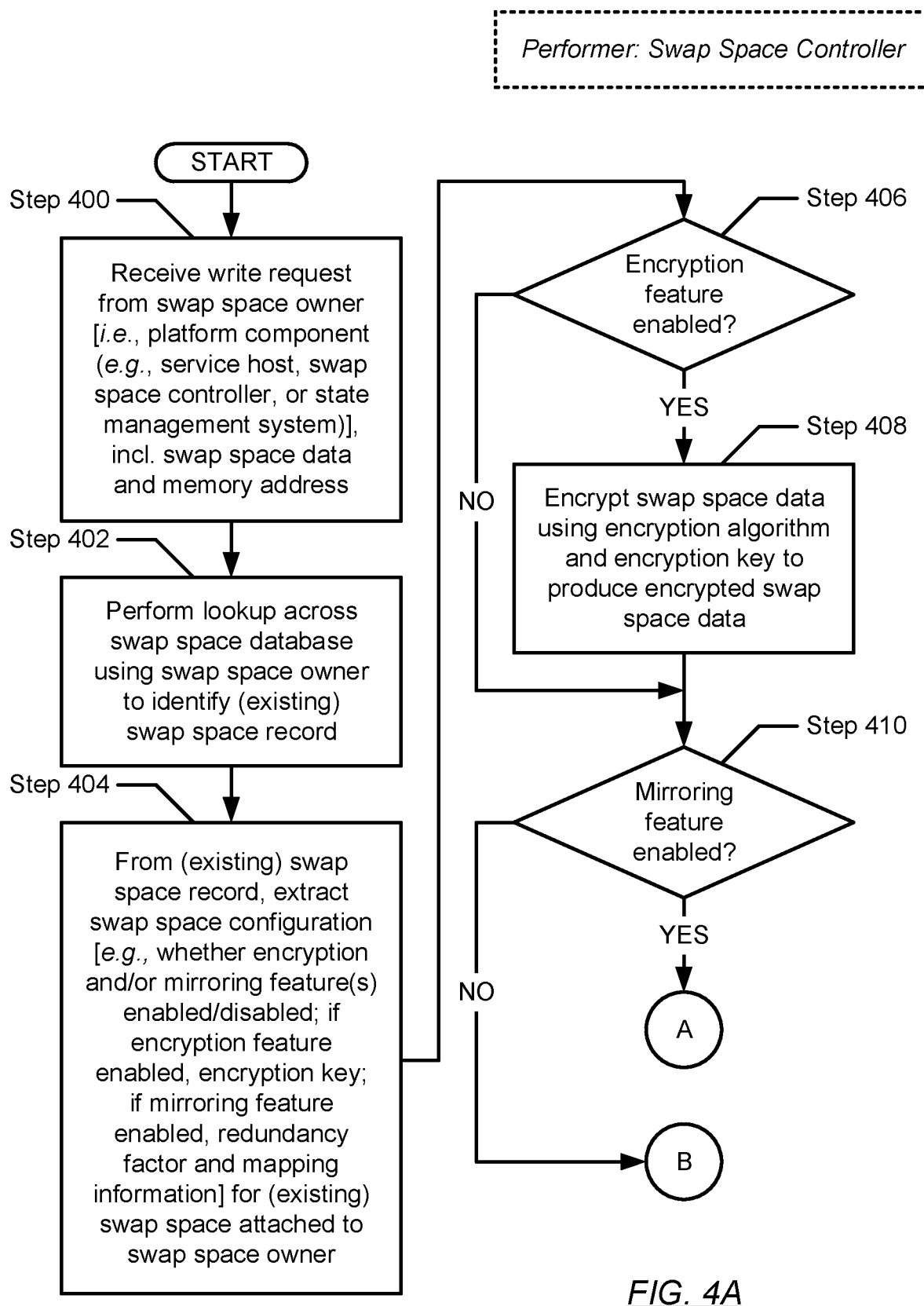
FIGS. 4A and 4B show a flowchart describing a method for processing write requests in accordance with one or more embodiments described herein.
Figure 4B:
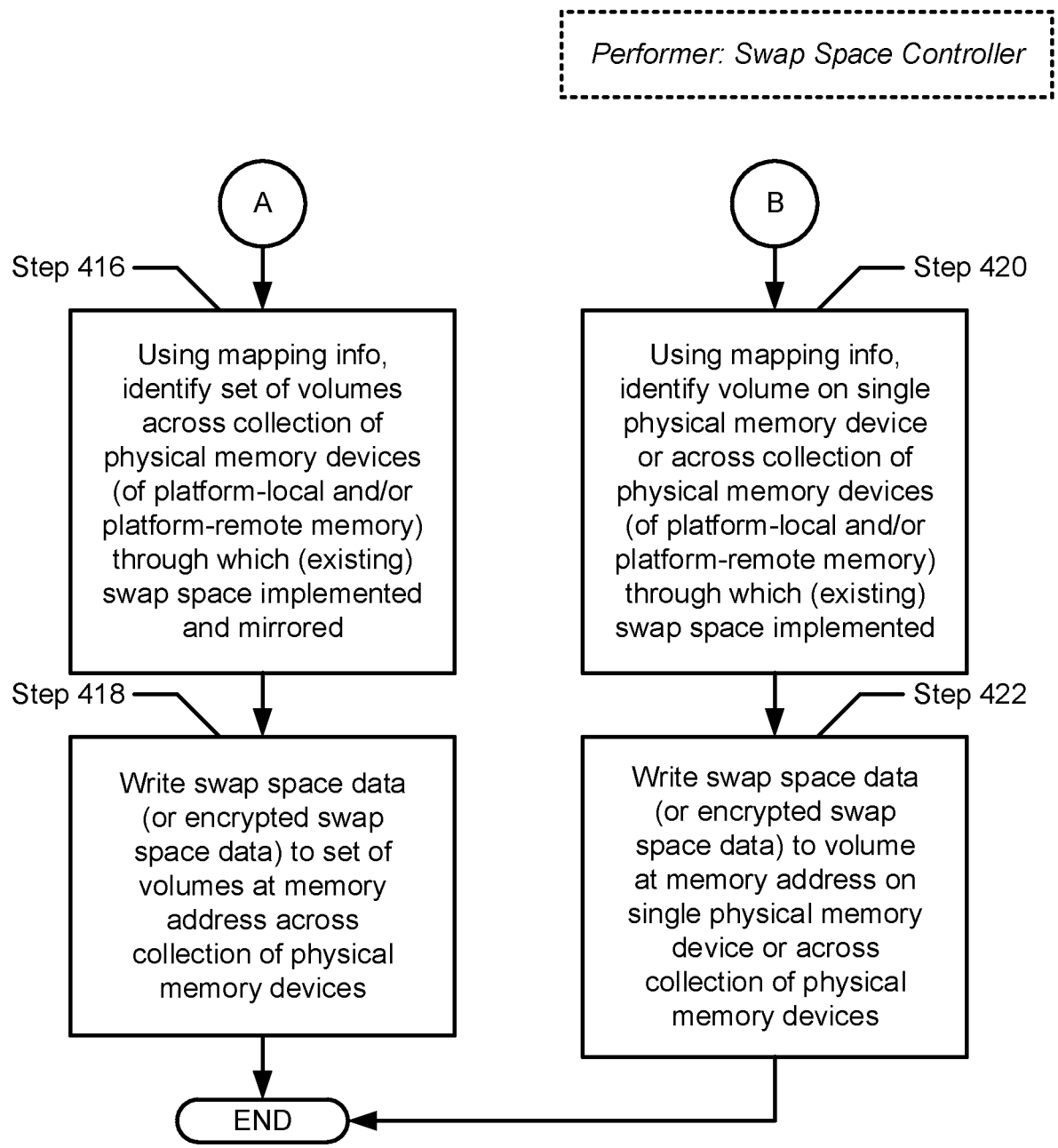

FIGS. 4A and 4B show a flowchart describing a method for processing write requests in accordance with one or more embodiments described herein. The various steps outlined below may be performed by the swap space controller (i.e., the (external) swap space controller of the service delivery platform (see e.g., FIGS. 1A and 1D) or any (internal) swap space controller of any service host (see e.g., FIGS. 1B and 1D)). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, a write request is received from a swap space owner of an attached swap space thereon. In one or many embodiment(s) described herein, the swap space owner may refer to a platform component—e.g., any service host, the swap space controller, or the state management system (all described above) (see e.g., FIG. 1A). The write request, further, may be directed to writing or storing one or more inactive (or infrequently accessed) memory pages (i.e., (plaintext) swap space data), from any physically installed memory resources of the swap space owner, to the attached swap space and, by extension, to any physical memory device(s) (or portions thereof) of the platform-local memory and/or the platform-remote memory backing said attached swap space. As such, the write request may include the (plaintext) swap space data sought to be written/stored, and a memory address (or memory addresses) of said any physical memory device(s) (or portions thereof) whereto the swap space data is to be written/stored thereon.

In Step 402, a lookup is performed on/across a swap space database (described above) (see e.g., FIG. 1D) using the swap space owner (or more specifically, a unique identifier assigned thereto) (received in Step 400). In one or many embodiment(s) described herein, the lookup may result in the identification of an (existing) swap space record maintained in the swap space database.

In Step 404, from the (existing) swap space record (identified in Step 402), a swap space configuration, for the attached swap space of the swap space owner, is extracted. In one or many embodiment(s) described herein, the swap space configuration may include: information (e.g., a binary or bit value) indicating whether an encryption feature, concerning any swap space data maintained on any physical memory device(s) (or portions thereof) of the platform-local memory and/or the platform-remote memory backing said attached swap space, is enabled or disabled; should the encryption feature be enabled, an encryption key provided earlier by the swap space owner and employed in the encryption of (plaintext) swap space data and the decryption of (ciphertext) swap space data; information (e.g., a binary or bit value) indicating whether a mirroring feature, concerning any swap space data maintained on any physical memory device(s) (or portions thereof) of the platform-local memory and/or the platform-remote memory backing said attached swap space, is enabled or disabled; and should the mirroring feature be enabled: a redundancy factor (e.g., expressed as a whole number) reflecting the number of swap space copies (i.e., at least two) that exist for the attached swap space across different physical memory devices, and mapping information relating a volume representative of each swap space copy to a location (or locations) (e.g., a memory address or memory addresses) on one or more physical memory devices of the platform-local memory and/or the platform-remote memory whereon the swap space copy resides.

In Step 406, based on the swap space configuration (extracted in Step 404), a determination is made as to whether the above-mentioned encryption feature is enabled. By way of example, the determination may entail reading the information (e.g., a binary or bit value) indicating whether the encryption feature is enabled or disabled. As such, in one or many embodiment(s) described herein, if it is determined that the encryption feature is enabled, then the method proceeds to Step 408. On the other hand, in one or many other embodiment(s) described herein, if it is alternatively determined that the encryption feature is disabled, then the method alternatively proceeds to Step 410.

In Step 408, following the determination (made in Step 406) that the above-mentioned encryption feature is enabled based on the swap space configuration (extracted in Step 404), the (plaintext) swap space data (received in Step 400) is encrypted. In one or many embodiment(s) described herein, encryption of the (plaintext) swap space data may involve any existing encryption algorithm and the encryption key (specified in the swap space configuration), and thus may produce encrypted (or ciphertext) swap space data.

In Step 410, following encryption (in Step 408) of the (plaintext) swap space data (received in Step 400), or following the alternate determination (made in Step 406) that the above-mentioned encryption feature is disabled based on the swap space configuration (extracted in Step 404), a determination is made as to whether the above-mentioned mirroring feature is enabled based on the swap space configuration. By way of example, the determination may entail reading the information (e.g., a binary or bit value) indicating whether the mirroring feature is enabled or disabled. As such, in one or many embodiment(s) described herein, if it is determined that the mirroring feature is enabled, then the method proceeds to Step 416 (see e.g., FIG. 4B). On the other hand, in one or many other embodiment(s) described herein, if it is alternatively determined that the mirroring feature is disabled, then the method alternatively proceeds to Step 420 (see e.g., FIG. 4B).

Turning to FIG. 4B, in Step 416, following the determination (made in Step 410) that the above-mentioned mirroring feature is enabled based on the swap space configuration (extracted in Step 404), a set of volumes is identified using the mapping information (specified in the swap space configuration). In one or many embodiment(s) described herein, a cardinality of the set of volumes may match the redundancy factor (also specified in the swap space configuration) and, accordingly, any given volume in the set of volumes may correspond to or be representative of a given swap space copy of the at least two swap space copies created/maintained through RAID 1 mirroring. Further, each volume in the set of volumes may reside on at least a portion of one or more physical memory devices (of the platform-local and/or the platform-remote memory) that is/are different from any other physical memory device(s) (or portions thereof) on which any other volume(s) in the set of volumes reside(s).

In Step 418, the (plaintext) swap space data (received in Step 400), or the encrypted (i.e., ciphertext) swap space data (produced in Step 408), is written to each volume in the set of volumes (identified in Step 416) either in series or in parallel. More specifically, in one or many embodiment(s) described herein, on the physical memory device(s) corresponding to each volume in the set of volumes, the (plaintext or ciphertext) swap space data may be stored at the memory address(es) (received in Step 400).

In Step 420, following the alternate determination (made in Step 410) that the above-mentioned mirroring feature is disabled based on the swap space configuration (extracted in Step 404), a single volume is identified using the mapping information (specified in the swap space configuration). In one or many embodiment(s) described herein, the single volume may correspond to or be representative of the attached swap space provisioned to the swap space owner (from which the write request had been received in Step 400). Further, the single volume may reside on at least a portion of one or more physical memory devices (of the platform-local and/or the platform-remote memory).

In Step 422, the (plaintext) swap space data (received in Step 400), or the encrypted (i.e., ciphertext) swap space data (produced in Step 408), is written to the single volume (identified in Step 420). More specifically, in one or many embodiment(s) described herein, on the physical memory device(s) corresponding to the single volume, the (plaintext or ciphertext) swap space data may be stored at the memory address(es) (received in Step 400).

Figure 5A:
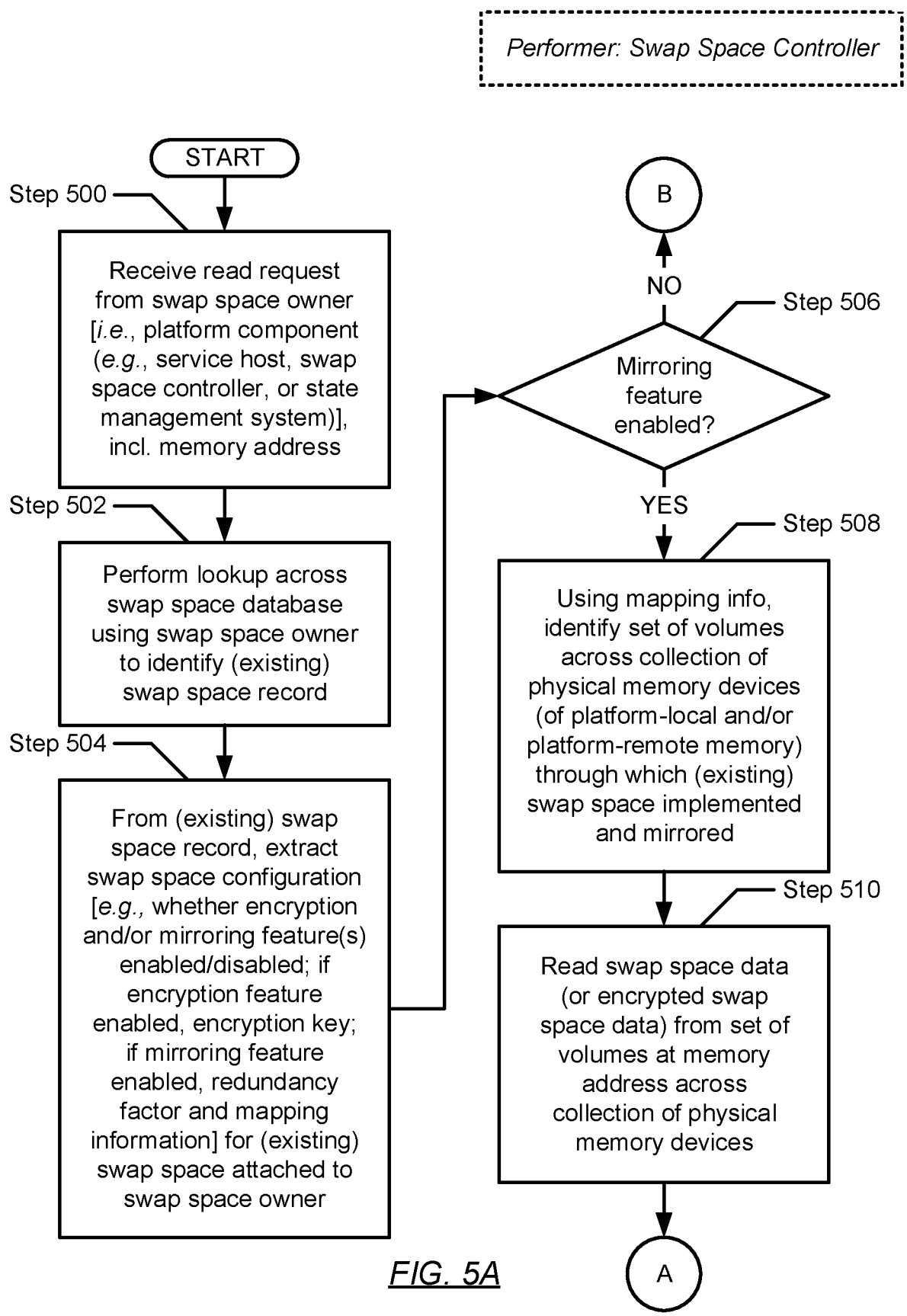
FIGS. 5A and 5B show a flowchart describing a method for processing read requests in accordance with one or more embodiments described herein.
Figure 5B:
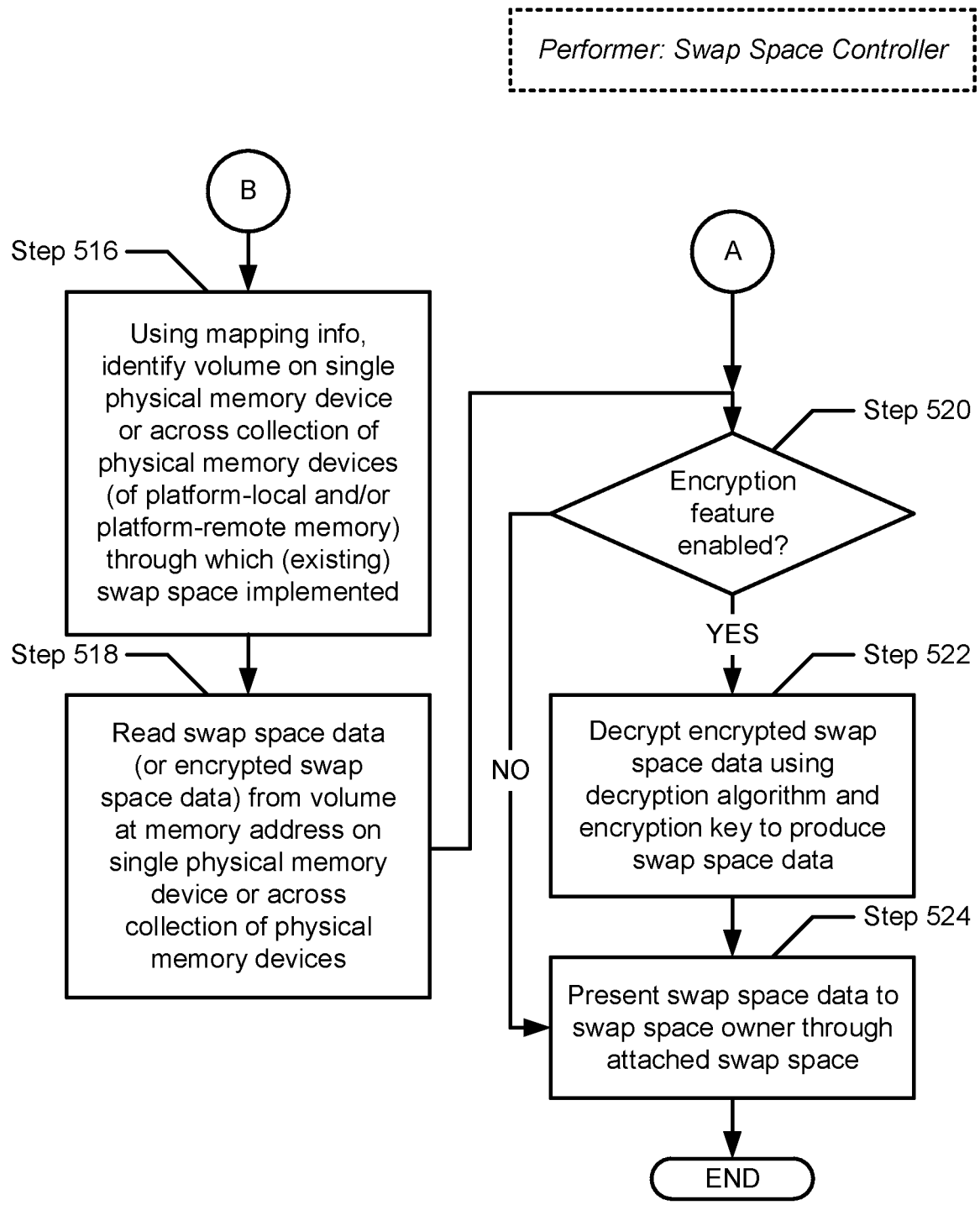

FIGS. 5A and 5B show a flowchart describing a method for processing read requests in accordance with one or more embodiments described herein. The various steps outlined below may be performed by the swap space controller (i.e., the (external) swap space controller of the service delivery platform (see e.g., FIGS. 1A and 1D) or any (internal) swap space controller of any service host (see e.g., FIGS. 1B and 1D)). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, a read request is received from a swap space owner of an attached swap space thereon. In one or many embodiment(s) described herein, the swap space owner may refer to a platform component—e.g., any service host, the swap space controller, or the state management system (all described above) (see e.g., FIG. 1A). The read request, further, may be directed to reading or retrieving one or more inactive (or infrequently accessed) memory pages (i.e., (plaintext) swap space data), from the attached swap space and, by extension, from any physical memory device(s) (or portions thereof) of the platform-local memory and/or the platform-remote memory backing said attached swap space. As such, the read request may include a memory address (or memory addresses) of said any physical memory device(s) (or portions thereof) wherefrom the (plaintext or ciphertext converted into plaintext) swap space data may be read/retrieved.

In Step 502, a lookup is performed on/across a swap space database (described above) (see e.g., FIG. 1D) using the swap space owner (or more specifically, a unique identifier assigned thereto) (received in Step 500). In one or many embodiment(s) described herein, the lookup may result in the identification of an (existing) swap space record maintained in the swap space database.

In Step 504, from the (existing) swap space record (identified in Step 502), a swap space configuration, for the attached swap space of the swap space owner, is extracted. In one or many embodiment(s) described herein, the swap space configuration may include: information (e.g., a binary or bit value) indicating whether an encryption feature, concerning any swap space data maintained on any physical memory device(s) (or portions thereof) of the platform-local memory and/or the platform-remote memory backing said attached swap space, is enabled or disabled; should the encryption feature be enabled, an encryption key provided earlier by the swap space owner and employed in the encryption of (plaintext) swap space data and the decryption of (ciphertext) swap space data; information (e.g., a binary or bit value) indicating whether a mirroring feature, concerning any swap space data maintained on any physical memory device(s) (or portions thereof) of the platform-local memory and/or the platform-remote memory backing said attached swap space, is enabled or disabled; and should the mirroring feature be enabled: a redundancy factor (e.g., expressed as a whole number) reflecting the number of swap space copies (i.e., at least two) that exist for the attached swap space across different physical memory devices, and mapping information relating a volume representative of each swap space copy to a location (or locations) (e.g., a memory address or memory addresses) on one or more physical memory devices of the platform-local memory and/or the platform-remote memory whereon the swap space copy resides.

In Step 506, based on the swap space configuration (extracted in Step 504), a determination is made as to whether the above-mentioned mirroring feature is enabled. By way of example, the determination may entail reading the information (e.g., a binary or bit value) indicating whether the mirroring feature is enabled or disabled. As such, in one or many embodiment(s) described herein, if it is determined that the mirroring feature is enabled, then the method proceeds to Step 508. On the other hand, in one or many other embodiment(s) described herein, if it is alternatively determined that the mirroring feature is disabled, then the method alternatively proceeds to Step 516 (see e.g., FIG. 5B).

In Step 508, following the determination (made in Step 506) that the above-mentioned mirroring feature is enabled based on the swap space configuration (extracted in Step 504), a set of volumes is identified using the mapping information (specified in the swap space configuration). In one or many embodiment(s) described herein, a cardinality of the set of volumes may match the redundancy factor (also specified in the swap space configuration) and, accordingly, any given volume in the set of volumes may correspond to or be representative of a given swap space copy of the at least two swap space copies created/maintained through RAID 1 mirroring. Further, each volume in the set of volumes may reside on at least a portion of one or more physical memory devices (of the platform-local and/or the platform-remote memory) that is/are different from any other physical memory device(s) (or portions thereof) on which any other volume(s) in the set of volumes reside(s).

In Step 510, the sought (plaintext or encrypted/ciphertext) swap space data is read simultaneously from each volume in the set of volumes (identified in Step 508). More specifically, in one or many embodiment(s) described herein, the sought (plaintext or encrypted/ciphertext) swap space data may be retrieved from the memory address(es) (received in Step 500) located on the physical memory device(s) corresponding to each volume in the set of volumes.

Hereinafter, the method proceeds to Step 520 (see e.g., FIG. 5B).

Turning to FIG. 5B, in Step 516, following the alternate determination (made in Step 506) that the above-mentioned mirroring feature is disabled based on the swap space configuration (extracted in Step 504), a single volume is identified using the mapping information (specified in the swap space configuration). In one or many embodiment(s) described herein, the single volume may correspond to or be representative of the attached swap space provisioned to the swap space owner (from which the read request had been received in Step 500). Further, the single volume may reside on at least a portion of one or more physical memory devices (of the platform-local and/or the platform-remote memory).

In Step 518, the sought (plaintext or encrypted/ciphertext) swap space data is read from the single volume (identified in Step 516). More specifically, in one or many embodiment(s) described herein, the sought (plaintext or encrypted/ciphertext) swap space data may be retrieved from the memory address(es) (received in Step 500) located on the physical memory device(s) corresponding to the single volume.

In Step 520, following the retrieval of sought (plaintext or encrypted/ciphertext) swap space data (in Step 510 or Step 518), a determination is made as to whether the above-mentioned encryption feature is enabled based on the swap space configuration (extracted in Step 504). By way of example, the determination may entail reading the information (e.g., a binary or bit value) indicating whether the encryption feature is enabled or disabled. As such, in one or many embodiment(s) described herein, if it is determined that the encryption feature is enabled, then the method proceeds to Step 522. On the other hand, in one or many other embodiment(s) described herein, if it is alternatively determined that the encryption feature is disabled, then the method alternatively proceeds to Step 524.

In Step 522, following the determination (made in Step 520) that the above-mentioned encryption feature is enabled based on the swap space configuration (extracted in Step 504), the retrieved encrypted/ciphertext swap space data is decrypted. In one or many embodiment(s) described herein, decryption of the (encrypted/ciphertext) swap space data may involve an existing decryption algorithm (representing the counterpart for the existing encryption algorithm used to encrypt the swap space data) and the encryption key (specified in the swap space configuration), and thus may produce (plaintext) swap space data.

In Step 524, following decryption (in Step 522) of the encrypted/ciphertext swap space data (retrieved in Step 510 or Step 518), or following the alternate determination (made in Step 520) that the above-mentioned encryption feature is disabled based on the swap space configuration (extracted in Step 504), the sought (plaintext) swap space data (alternatively retrieved in Step 510/518 or produced in Step 522) is presented to the swap space owner through the attached swap space thereon.

Figure 6:
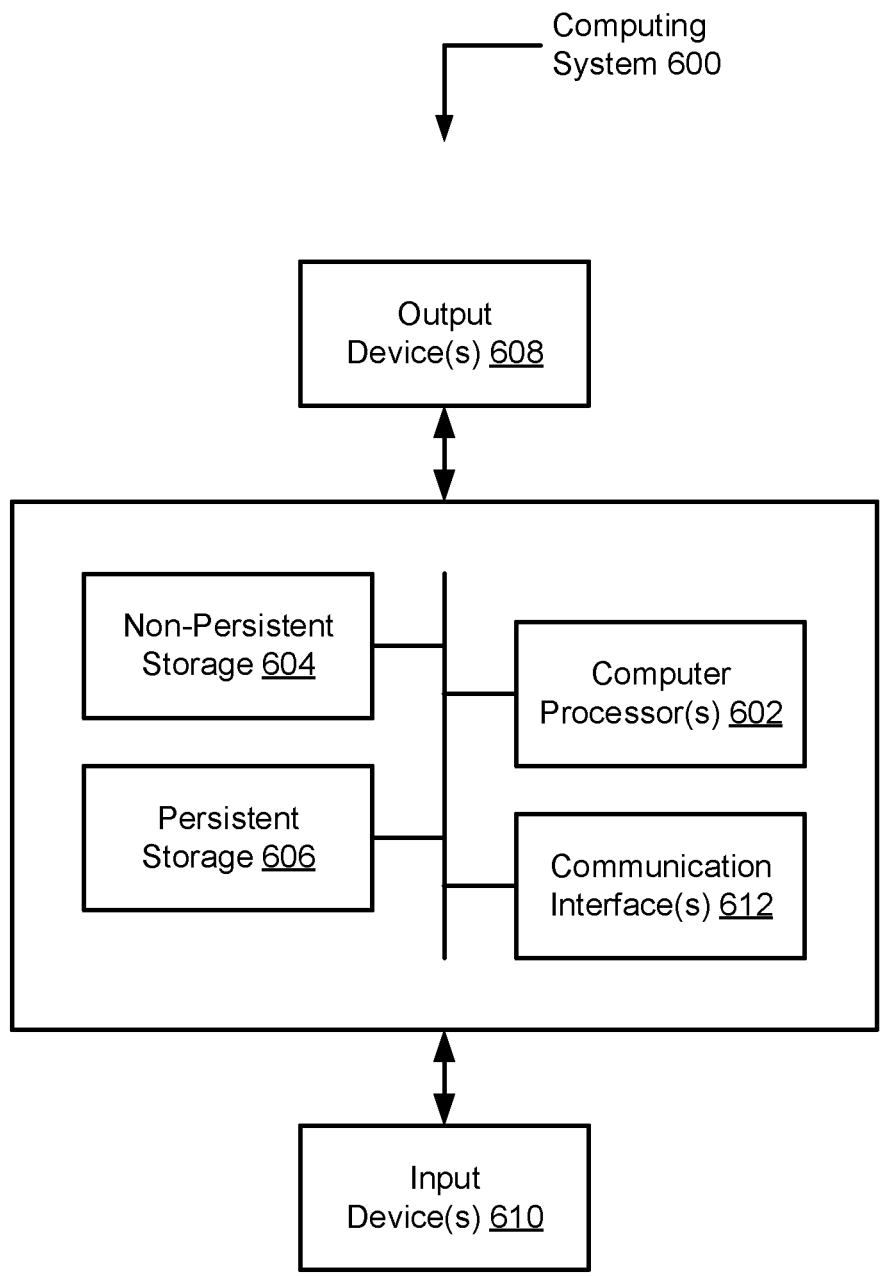
FIG. 6 shows a computing system in accordance with one or more embodiments described herein.

FIG. 6 shows a computing system in accordance with one or more embodiments described herein. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one or many embodiment(s) described herein, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one or many embodiment(s) described herein, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the technology has been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for provisioning swap spaces, the method comprising:
   receiving, from a platform orchestrator of a service delivery platform and directed to provisioning a swap space, a swap space instruction specifying a swap space owner and a swap space size;
   requesting, from the platform orchestrator in response to receiving the swap space instruction and subsequently receiving, a swap space configuration associated with the swap space;
   based on at least a portion of the swap space configuration:
      selecting, at least based on the swap space size, at least one physical memory device;
      creating at least one volume on the at least one physical memory device;
      creating an emulated memory drive using the at least one volume; and
      presenting, to the swap space owner, the emulated memory drive as attached swap space representing the swap space.

2. The method of claim 1, wherein the swap space owner is a platform component of the service delivery platform, and wherein the platform component is one selected from a group of platform components comprising a service host, a state management system, and a swap space controller.

3. The method of claim 1, wherein the swap space configuration specifies that a mirroring feature, concerning the swap space, is enabled, and wherein the swap space configuration further specifies a redundancy factor as a result of the mirroring feature being enabled.

4. The method of claim 3, wherein the at least one physical memory device comprises a plurality of physical memory devices, a cardinality of the plurality of physical memory devices matching the redundancy factor, and wherein each physical memory device in the plurality of physical memory devices comprises unallocated space at least equaling the swap space size.

5. The method of claim 4, wherein the at least one volume comprises a second plurality of volumes implemented respectively on the plurality of physical memory devices, and the method further comprises:
   prior to selecting the at least one memory device:
      creating, in a swap space database, a new swap space record associated with the swap space owner and comprising the swap space configuration; and
   after creating the at least one volume on the at least one physical memory device:
      obtaining mapping information relating the second plurality of volumes to the plurality of physical memory devices; and
      updating the new swap space record to reflect the mapping information in the swap space configuration.

6. The method of claim 1, wherein the swap space configuration specifies that a mirroring feature, concerning the swap space, is disabled.

7. The method of claim 6, wherein the at least one physical memory device comprises a single physical memory device, and wherein the single physical memory device comprises unallocated space at least equaling the swap space size.

8. The method of claim 7, wherein the at least one volume comprises a single volume implemented on the single physical memory device, and the method further comprises:
   prior to selecting the at least one memory device:
      creating, in a swap space database, a new swap space record associated with the swap space owner and comprising the swap space configuration; and
   after creating the at least one volume on the at least one physical memory device:
      obtaining mapping information relating the single volume to the single memory device; and
      updating the new swap space record to reflect the mapping information in the swap space configuration.

9. The method of claim 1, the method further comprising:
   after presenting the emulated memory drive as the attached swap space:
      receiving, from the swap space owner, a write request specifying swap space data and at least one memory address;
      identifying, from a swap space database, an existing swap space record associated with the swap space owner and comprising an updated swap space configuration; and
      based on at least a portion of the updated swap space configuration:
         storing, to the at least one physical memory device respectively at the at least one memory address, one selected from a group of data comprising the swap space data and encrypted swap space data derived from the swap space data.

10. The method of claim 1, the method further comprising:
   after presenting the emulated memory drive as the attached swap space:
      receiving, from the swap space owner, a read request specifying at least one memory address;
      identifying, from a swap space database, an existing swap space record associated with the swap space owner and comprising an updated swap space configuration;
      based on at least a portion of the updated swap space configuration:
         retrieving, from the at least one physical memory device respectively at the at least one memory address, one selected from a group of data comprising swap space data and encrypted swap space data; and
         presenting, to the swap space owner through the attached swap space, the one selected from the group of data,
            wherein if the one selected from the group of data is the encrypted swap space data, the encrypted swap space data is first decrypted to produce the swap space data prior to being presented.

11. A system, the system comprising:
a service delivery platform comprising:
   a platform orchestrator; and
   a swap space controller operatively connected to the platform orchestrator, and comprising a computer processor at least configured to perform a method for provisioning swap spaces, the method comprising:
      receiving, from a platform orchestrator and directed to provisioning a swap space, a swap space instruction specifying a swap space owner and a swap space size;
      requesting, from the platform orchestrator in response to receiving the swap space instruction and subsequently receiving, a swap space configuration associated with the swap space;
      based on at least a portion of the swap space configuration:
         selecting, at least based on the swap space size, at least one physical memory device;
         creating at least one volume on the at least one physical memory device;
         creating an emulated memory drive using the at least one volume; and
         presenting, to the swap space owner, the emulated memory drive as attached swap space representing the swap space.

12. The system of claim 11, the service delivery platform further comprising:
   at least one service host operatively connected to the platform orchestrator and the swap space controller,
   wherein the swap space owner is a service host of the at least one service host.

13. The system of claim 11, the service delivery platform further comprising:
   a state management system operatively connected to the platform orchestrator and the swap space controller,
   wherein the swap space owner is the state management system.

14. The system of claim 11, wherein the swap space owner is the swap space controller.

15. The system of claim 11, the service delivery platform further comprising:
   platform-local memory operatively connected to the swap space controller, and comprising at least one local memory device,
   wherein the at least one physical memory device is selected from the at least one local memory device.

16. The system of claim 15, the system further comprising:
   platform-remote memory operatively connected to the service delivery platform, and comprising at least one remote memory device,
   wherein the at least one physical memory device is selected from the at least one local memory device, the at least one remote memory device, or a combination of the at least one local memory device and the at least one remote memory device.

17. The system of claim 11, wherein the swap space owner comprises one selected from a group of computer processors comprising the computer processor and a second computer processor not belonging to the swap space controller, and further comprises at least one orchestrator agent executing on the one selected from the group of computer processors, and wherein the at least one orchestrator agent operatively connects to the platform orchestrator.

18. The system of claim 17, wherein the at least one orchestrator agent is at least configured to:
   monitor and provide memory metrics, concerning at least one of memory resources native to the swap space owner and the attached swap space, to the platform orchestrator for assessment; and
   provide, in response to receiving a request thereof, the swap space configuration to the swap space controller through the platform orchestrator.

19. The system of claim 11, the swap space controller further comprising:
   a memory drive emulator implemented using a portion of the computer processor or executing on the computer processor, and operatively connected to the swap space owner and at least one of:
      a platform-local memory residing inside the service delivery platform, and
      a platform-remote memory residing outside the service delivery platform.

20. A non-transitory computer readable medium (CRM) comprising computer readable program code, which when executed by a computer processor, enables the computer processor to perform a method for provisioning swap spaces, the method comprising:
   receiving, from a platform orchestrator of a service delivery platform and directed to provisioning a swap space, a swap space instruction specifying a swap space owner and a swap space size;
   requesting, from the platform orchestrator in response to receiving the swap space instruction and subsequently receiving, a swap space configuration associated with the swap space;
   based on at least a portion of the swap space configuration:
      selecting, at least based on the swap space size, at least one physical memory device;
      creating at least one volume on the at least one physical memory device;
      creating an emulated memory drive using the at least one volume; and
      presenting, to the swap space owner, the emulated memory drive as attached swap space representing the swap space.

* * * * *